United States Patent
Rahamim et al.

(10) Patent No.: US 7,619,579 B2
(45) Date of Patent: Nov. 17, 2009

(54) SMART ANTENNA SYSTEM WITH IMPROVED LOCALIZATION OF POLARIZED SOURCES

(75) Inventors: Dayan Rahamim, Herzliya (IL); Reuven Shavit, Pardesia (IL); Joseph Tabrikian, Tel-Aviv (IL)

(73) Assignee: Ben Gurion University of the Negev Research and Development Authority, Beer-Sheva (IL)

( * ) Notice: Subject to any disclaimer, the term of this patent is extended or adjusted under 35 U.S.C. 154(b) by 249 days.

(21) Appl. No.: 10/535,145

(22) PCT Filed: Nov. 17, 2003

(86) PCT No.: PCT/IL03/00971

§ 371 (c)(1),
(2), (4) Date: Dec. 28, 2005

(87) PCT Pub. No.: WO2004/049498

PCT Pub. Date: Jun. 10, 2004

(65) Prior Publication Data

US 2006/0158374 A1    Jul. 20, 2006

Related U.S. Application Data

(60) Provisional application No. 60/428,280, filed on Nov. 22, 2002.

(51) Int. Cl.
*H01Q 9/16* (2006.01)
(52) U.S. Cl. .................................. 343/793; 343/795
(58) Field of Classification Search .............. None
See application file for complete search history.

(56) References Cited

U.S. PATENT DOCUMENTS

| | | | |
|---|---|---|---|
| 2,953,782 A | | 9/1960 | Byatt |
| 4,809,009 A | * | 2/1989 | Grimes et al. ............. 343/726 |
| 5,300,885 A | | 4/1994 | Bull |
| 5,307,081 A | * | 4/1994 | Harmuth .................. 343/842 |
| 6,211,846 B1 | | 4/2001 | Gouin |
| 6,329,955 B1 | * | 12/2001 | McLean et al. ........... 343/742 |
| 6,437,750 B1 | | 8/2002 | Grimes et al. |
| 7,215,292 B2 | * | 5/2007 | McLean ................... 343/725 |

OTHER PUBLICATIONS

Ziskind et al. "Maximum Likelihood Localization of Diversely Polarized Sources by Simulated Annealing", IEEE Transactions on Antennas and propagation, 38,(7): 1111-1114, 1990.
Li "Direction and Polarization Estimation Using Arrays with small Loops and short Dipoles", IEEE Transactions on Antennas and Propagation, 41(3): 379-389, 1993.

(Continued)

*Primary Examiner*—Trinh V Dinh

(57) ABSTRACT

An antenna array and signal preprocessing apparatus and method. The antenna array is a quadrature polarized array having two orthogonal electric dipoles and two orthogonal magnetic dipoles. The preprocessor is for preprocessing signals from the antenna, for obtaining spatial spectrum information for signal source location. The preprocessor comprises an autocorrelator, connected after said input, for forming signal autocorrelation matrices for each element, and an smoother, connected after said autocorrelator, for averaging said autocorrelation matrices, thereby to form a sample covariance matrix suitable for use in a Eigenstructure based estimator for estimating source localization.

18 Claims, 13 Drawing Sheets

OTHER PUBLICATIONS

Nehorai et al. "Vector-Sensor Array Processing for Electromagnetic Source Localization", IEEE Transactions on Signal Processing, 42(2): 376-398, 1994.

Hatke "Conditions for Unambiguous Source Location Using Polarization Diverse Arrays", MIT Lincoln Laboratory, IEEE: 1365-1369, 1993.

Hochwald et al. "Polarimetric Modeling and Parameter Estimation with Applications to Remote Sensing", IEEE Transactions on Signal Processing, 43(8), 1995.

Hochwald et al. "Identifiability in Array Processing Models with Vector-Sensor Applications", IEEE Transactions on Signal Processing, 44(1): 83-95, 1996.

Tan et al. "Linear Independence of Steering Vectors of an Electromagnetic Vector Sensor", IEEE Transactions on Signal Processing, 44(12): 3099-3107, 1996.

Wong et al. "Closed-Form Direction Finding and Polarization Estimation with Arbitrarily Spaced Electromagnetic Vector-Sensors at Unknown Locations", IEEE Transactions on Antennas and Propagation, 48(5): 671-681, 2000.

Wong et al. "Self-Initiating Music-Based Direction Finding and Polarization Estimation in Spatio-Polarizational Beamspace", IEEE Transactions on Antennas and Propagation, 48(8): 1235-1245, 2000.

Translation of the Office Action Dated Oct. 17, 2008 From the State Intellectual Property Office of the People's Republic of China Re.: Application No. 200380109003.9.

Li et al. "Angle and Polarization Estimation in A Coherent Signal Environment", IEEE Transactions on Aerospace and Electronic Systems, XP000398818, 29(3): 706-716, Jul. 1, 1993.

Li et al. "Efficient Direction and Polarization Estimation With A Cold Array", IEEE Transactions on Antennas and Propagation, XP011002701, 44(4): 539-547, Apr. 1996.

Rahamim et al. "Coherent Source Localization Using Vector Sensor Array", The 22nd Convention of Electrical and Electronics Engineers in Israel, Piscataway, NJ, USA, IEEE, XP010631072, p. 127-130, Dec. 1, 2002.

Communication Pursuant to Article 94(3) EPC Dated Jul. 14, 2008 From the European Patent Office Re.: Application No. 03773966.1.

International Search Report Dated Jun. 7, 2004 From the International Searching Authority Re.: Application No. PCT/IL03/00971.

Supplementary European Search Report Dated Mar. 19, 2008 From the European Patent Office Re.: Application No. 03773966.1.

\* cited by examiner

SMART ANTENNA SYSTEM WITH IMPROVED LOCALIZATION OF POLARIZED SOURCES

RELATED PATENT APPLICATION

This application is a National Phase Application of PCT/IL03/00971 having International Filing Date of 17 Nov. 2003, which claims the benefit of U.S. Provisional Patent Application No. 60/428,280 filed 22 Nov. 2002.

FIELD AND BACKGROUND OF THE INVENTION

The present invention relates to a smart antenna method and apparatus and, more particularly, but not exclusively to the use of polarization as an additional parameter for determining the angle of arrival of impinging electromagnetic radiation.

Vector sensors enable estimation of the angle of arrival and polarization of impinging electromagnetic waves with arbitrary polarization. In the last decade, many array processing techniques for source localization and polarization estimation using vector sensors have been developed. A. Nehorai and E. Paldi, "Vector-sensor array processing for electromagnetic source localization," IEEE Trans. on Signal Processing, vol. 42, pp. 376-398, February 1994, the contents of which are hereby incorporated by reference, developed the Cramer-Rao bound (CRB) and the vector cross-product direction-of-arrival (DOA) estimator. Polarimetric modeling using vector sensors is performed in B. Hochwald and A Nehorai, "Polarimetric modeling and parameter estimation with application to remote sensing" IEEE Trans. On Signal Processing, Vol. 43 pp. 1923-1935, August 1995 the contents of which are hereby incorporated by reference.

Identifiability and uniqueness issues associated with vector sensors are analyzed in G. F. Hatke, $27^{th}$ Asilomar Conf. 1993, pp 1365-1369, K. C. Ho, K. C. Tan, W. Ser, Signal Processing Vol. 47 pp 41-54 November 1995, B. Hochwald and A Nehorai, IEEE Trans on Signal Processing, Vol. 44 No. 1 pp. 83-95 January 1996, K. C. Tan, K. C. Ho, A. Nehorai IEEE Trans. Signal Processing, Vol. 44 pp. 3099-3107, December 1996. The contents of each of the above documents are hereby incorporated by reference.

Eigenstructure-based techniques, such as ESPRIT and multiple signal classification (MUSIC) for source localization using vector sensors have been extensively investigated. J. Li, IEEE Trans. Antenna Propagation. Vol. 41. pp. 379-387 March 1993, the contents of which are hereby incorporated by reference, applied the ESPRIT algorithm to a vector sensor array. ESPRIT-based direction finding algorithms using vector sensors have been further investigated in several papers including K. T. Wong and M. Zoltowski, IEEE Trans. Antenna Propagation. Vol. 48 pp 671-681, May 2000, the contents of which are hereby incorporated by reference. MUSIC-based algorithms for the same problem have been applied in K. T. Wong and M. Zoltowski, IEEE Trans. Antenna Propagation. Vol. 48 pp 1235-1245 and 2205-2210, August 2000. These techniques yield high-resolution and asymptotically efficient estimates in case of uncorrelated or partially correlated signals. However, since these techniques assume a non-singular signal correlation matrix, they encounter difficulties in cases of fully correlated signals such as signals from a single source in a multipath scenario. The latter is particularly common in cellular telephony in the urban environment.

In order to decorrelate signals in a data covariance matrix, Evans et al. in Proc. $1^{st}$ ASSP Workshop spectral Estimation, Hamilton Ontario Canada, 1981 pp 34-139, the contents of which are hereby incorporated by reference, proposed a preprocessing technique referred to as spatial smoothing. Several later authors investigated the spatial smoothing method, in combination with the method of forward-backward averaging. The drawback of the above combination is the reduction of the effective array aperture length, resulting in lower resolution and accuracy. An alternative spatial averaging method is redundancy averaging. It has been shown that a preprocessing method based on redundancy averaging induces bias in the DOA estimates.

A Maximum Likelihood (ML) approach for diversely polarized source localization was proposed in Wax and Ziskind, IEEE Transactions Antenna Propagation vol 38, pp. 111-1114, July 90. The maximum likelihood method uses the simulated annealing algorithm to efficiently search over the signal DOA's and polarization vectors.

The above approach however still does not overcome the difficulties introduced by having correlated signals, as would be expected when seeing multi-path versions of the same signal.

There is thus a widely recognized need for, and it would be highly advantageous to have, a decorrelation method usable with a smart antenna, which is devoid of the above limitations and is therefore useful for cellular telephony in urban areas and for other cases where multi-path is a significant problem.

SUMMARY OF THE INVENTION

According to one aspect of the present invention there is provided a quadrature polarized antenna element comprising a plurality of electric dipoles arranged at a predetermined angle with respect to one another and a plurality of magnetic dipoles arranged at said predetermined angle with respect to one another, and wherein each magnetic dipole substantially shares a common location with a respective one of said electric dipoles. Preferably, said predetermined angle is substantially a right angle. Furthermore, said plurality of dipoles are arranged to obtain electromagnetic source information from throughout the azimuth plane.

Preferably, said electromagnetic source information is such as to allow extraction of at least one of a group comprising signal localization, signal polarization, and data content.

The element is preferably arranged to detect signals from substantially throughout the azimuth plane, said electric dipoles and said magnetic dipoles being arranged to complement each other in respect of polarization information in said signals, thereby to enable said element to obtain substantially all polarization information within said azimuth plane.

Preferably, said element comprises four dipoles, of which two of said dipoles are electric dipoles, and two of said dipoles are magnetic dipoles. In a preferred embodiment, the two electric dipoles are mutually orthogonal and said magnetic dipoles are mutually orthogonal, and each of said magnetic dipoles is co-directed with one of said electric dipoles.

According to a second aspect of the present invention, there is provided a quadrature polarized antenna array, comprising a plurality of antenna elements, each element comprising a plurality of electric dipoles arranged at a predetermined angle with respect to one another and a plurality of magnetic dipoles arranged at said predetermined angle with respect to one another, and wherein each magnetic dipole substantially shares a common location with a respective one of said electric dipoles. The properties of the individual elements are as described above, and the arrangement of the elements into an array provides additional properties to the array such as the ability to resolve originating sources from multipath variations of the signal. For an array having n elements, the array is able to resolve n−1 signals.

In one embodiment, the array comprises an electric switch or switching element for switching between dipoles or a switch for switching between elements to gather data over said array.

In one embodiment, the array has connected thereto a signal preprocessor for preprocessing signals from said antenna for obtaining spatial spectrum information for signal source location, the preprocessor comprising:

a sensor autocorrelator configured for forming signal autocorrelation matrices for each sensor type, and a smoother configured for smoothing said autocorrelation matrices, thereby to form at least one covariance matrix comprising spatial spectrum information.

Preferably, the antenna array has connected thereto a source locator configured for using said sample covariance matrix in an eigenstructure-based signal source localization technique.

Preferably, said smoother is further configured to apply forward backward smoothing to said sample covariance matrix, thereby to increase a maximum number of signal sources that can be localized.

The array preferably has a steering vector of antenna specific parameters for use together with said sample covariance matrix in said source locator.

In one embodiment, the array has connected thereto a signal preprocessor for preprocessing signals from said antenna for obtaining spatial spectrum information for signal source location, the preprocessor comprising:

an autocorrelator, connected after said input, for forming signal autocorrelation matrices for each element, and a smoother, connected after said autocorrelator, for smoothing said autocorrelation matrices, thereby to form a sample covariance matrix suitable for use in a Eigenstructure-based estimator for estimating source localization.

According to a third preferred embodiment of the present invention there is provided a method for preprocessing incoming signals obtained using a plurality of different sensor types, the signals including coherent signals, the preprocessing being for source localization, the method comprising obtaining angle of arrival and polarization information of incoming signals from each of said different sensor types, forming signal autocorrelation matrices for each sensor type, and smoothing said autocorrelation matrices, to form therefrom at least one covariance matrix suitable for use in eigenstructure-based signal source localization techniques.

The method may further comprise applying forward backward averaging to said sample covariance matrix, thereby to increase a maximum number of signal sources that can be localized.

The method may further comprise obtaining, at least once for each antenna, a steering vector for use together with said sample covariance matrix in said eigenstructure-based signal localization techniques.

Sensing or obtaining in the method is from four sensor types. Preferably, the sensor types are two respectively orthogonal electrical dipoles and two respectively orthogonal magnetic dipoles.

Preferably, the four sensor types are all arranged for sensing in a single plane. That is to say they are arranged to give full coverage of that plane, but of course they are still able to sense signals coming from above or below the plane.

The method may comprise using source localization information obtained from the data of said covariance matrix as an input to a beam director to provide a directed beam to a respective source.

Preferably, said incoming signal is a noise signal, and the method may comprise using source localization information obtained from said covariance matrix as an input to a beam director to provide a null of a directed beam to a respective source of said noise interference signal.

According to a fourth aspect of the present invention there is provided a method for processing incoming signals obtained using a plurality of different sensor types, the signals including coherent signals, the preprocessing being for source localization, the method comprising obtaining angle of arrival and polarization information of incoming signals, forming signal autocorrelation matrices over an array of said sensors, and forming a sample covariance matrix from said signal autocorrelation matrices, said sample covariance matrix being suitable for use in a maximum likelihood estimator for estimating source localization.

Preferably, said maximum likelihood estimator is $$(\hat{\theta}, \hat{\phi}) = \underset{\theta,\phi}{\mathrm{argmax}}\, \lambda_{\max}\{\underbrace{F_T^H(\theta, \phi)R_n^{-1}\hat{R}_y R_n^{-1} F_T(\theta, \phi)}_{\Psi_2(\theta,\phi)}, \underbrace{F_T^H(\theta, \phi)R_n^{-1} F_T(\theta, \phi)}_{\Psi_1(\theta,\phi)}\}$$

wherein:

$\theta$—vector of the elevation angles of the sources, $\phi$—vector of the azimuth angles of the sources, $\lambda_{max}$—maximum generalized eigenvalue of the matrix pair $(\Psi_2(\theta,\phi), \Psi_1(\theta,\phi))$ $F_T(\theta,\phi)$—matrix whose columns denote spatial transfer functions for both polarization components of the sources, $H$—matrix hermitian operation (complex conjugate and transpose)

$R_n$—noise and interference covariance matrix $\hat{R}_y$—sample covariance matrix The method may use source localization information obtained from said covariance matrix as an input to a beam director to provide a directed beam to a respective source.

Typically, the incoming signals includes noise, for which the method further comprises using source localization information obtained from said covariance matrix as an input to a beam director to provide a null of a directed beam to a respective source of detected noise.

According to a fifth aspect of the present invention there is provided apparatus for preprocessing incoming signals obtained using a plurality of different sensor types, the signals including coherent signals, the preprocessing being for source localization, the apparatus comprising an input for obtaining angle of arrival and polarization information of incoming signals from each of said different sensor types, a sensor autocorrelator configured for forming signal autocorrelation matrices for each sensor type, and a smoother, configured for smoothing said autocorrelation matrices, thereby to form at least one covariance matrix suitable for use in eigenstructure-based signal source localization techniques.

Preferably, said smoother is further configured to apply forward backward averaging to said sample covariance matrix, thereby to increase a maximum number of signal sources that can be localized.

The apparatus may make use of a steering vector for use together with said sample covariance matrix in said eigenstructure-based signal localization techniques.

The apparatus preferably makes use of the four sensor types discussed above.

The apparatus may comprise a covariance unit, also connected after said autocorrelator, for forming a covariance matrix from which a sample covariance matrix can be extracted, said sample covariance matrix being suitable for use in a maximum likelihood estimator for estimating source localization.

The apparatus may comprise a switching unit for switching between said smoother and said cross-correlator in accordance with a total number of apparent signal sources giving rise to said incoming signals.

According to a sixth aspect of the present invention, there is provided apparatus for processing incoming signals obtained using a plurality of different sensor types, the signals including coherent signals, the processing being for source localization, the apparatus comprising an input for obtaining angle of arrival and polarization information of incoming signals, an autocorrelator, connected after said input, for forming signal autocorrelation matrices for each element, and a covariance unit connected after said autocorrelator for forming a covariance matrix, from which a sample covariance matrix is extractable from said autocorrelation matrices, said sample covariance matrix being suitable for use in a maximum likelihood estimator for estimating source localization.

Preferably the maximum likelihood estimator is defined as $$(\hat{\theta}, \hat{\phi}) = \underset{\theta, \phi}{\operatorname{argmax}} \lambda_{\max} \{ \underbrace{F_T^H(\theta, \phi) R_n^{-1} \hat{R}_y R_n^{-1} F_T(\theta, \phi)}_{\Psi_2(\theta,\phi)}, \underbrace{F_T^H(\theta, \phi) R_n^{-1} F_T(\theta, \phi)}_{\Psi_1(\theta,\phi)} \}$$

wherein:

θ—vector of the elevation angles of the sources,

φ—vector of the azimuth angles of the sources, $\lambda_{max}$—maximum generalized eigenvalue of the matrix pair $(\Psi_2(\theta,\phi), \Psi_1(\theta,\phi))$ $F_T(\theta,\phi)$—matrix whose columns denote spatial transfer functions for both polarization components of the sources, (defined in (20))

$H$—matrix hermitian operation (complex conjugate and transpose)

$R_n$—noise and interference covariance matrix $\hat{R}_y$—sample covariance matrix Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the preprocessor and preprocessing method and system of the present invention involves performing or completing selected tasks or steps automatically using software or hardware or a combination thereof. Moreover, according to actual instrumentation and equipment of preferred embodiments of the method and system of the present invention, selected steps may be implemented in hardware or software on any operating system or any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, if is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
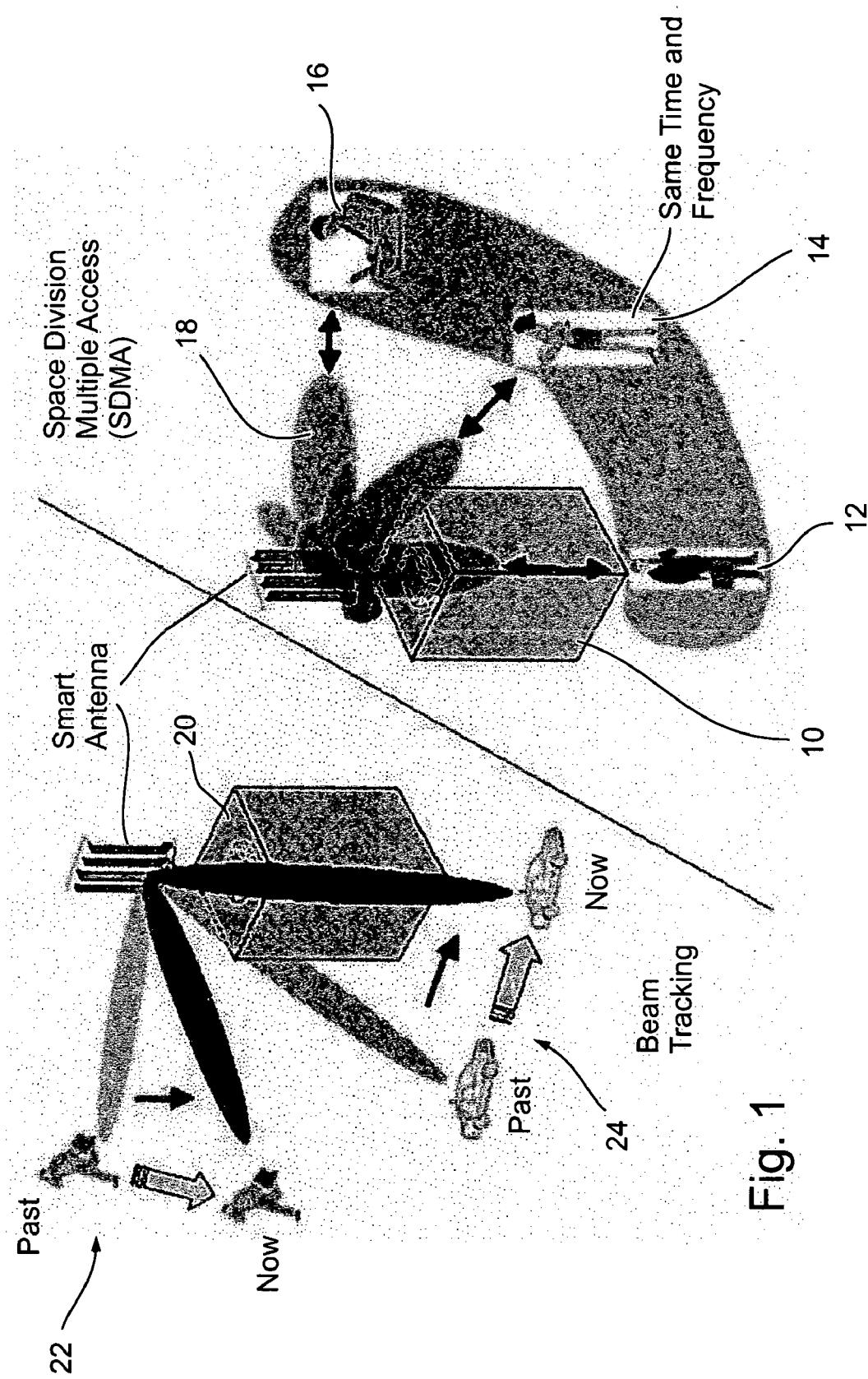
FIG. 1 is a schematic diagram illustrating two cellular base stations and showing how source location according to preferred embodiments of the present invention lead to more efficient use of the spectrum in the case of a single base station tracking two moving signal source/targets.
Figure 2C:
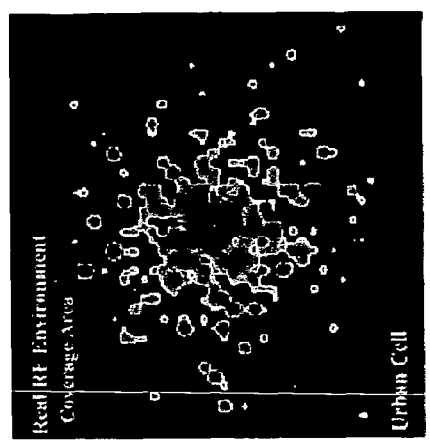
FIGS. 2a-2d are simplified diagrams illustrating coverage patterns for mobile base stations in ideal and real environments.
Figure 2D:
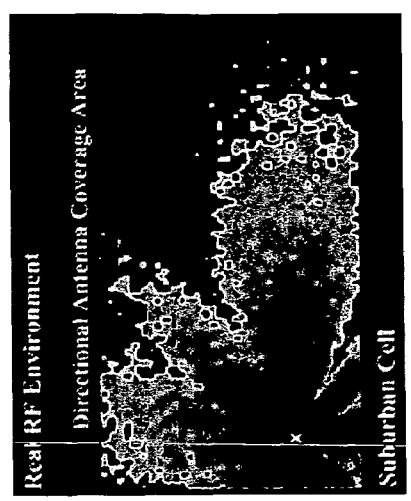
Figure 2A:
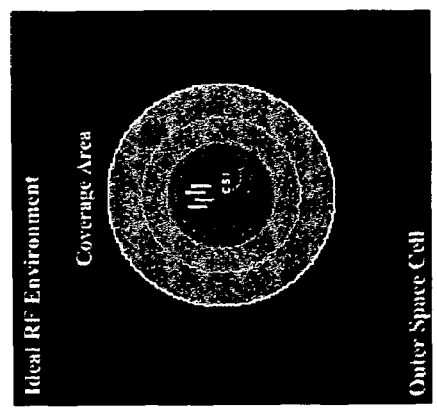
Figure 2B:
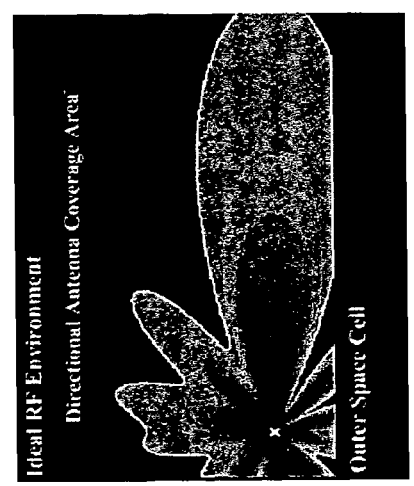

The present embodiments describe a smart antenna and associated methods for source localization using array vector sensors. In one embodiment a maximum-likelihood estimator provides source location for fully correlated sources. In a second embodiment, a preprocessing method overcomes the problem represented by singularities in the signal correlation matrix. The second embodiment is based on a procedure referred to herein as vector sensor smoothing (VSS), which provides spatial spectral information for the use of spectral based algorithms such as the eigenstructure based MUSIC, MVDR and ESPRIT methods, for DOA estimation in scenarios involving fully correlated signals. Once the sources have been located, it is possible to communicate using directed beams and thereby to make more efficient use of the spectrum. The present methods allow dynamic real time source location so that directed beam technology can be used for moving sources.

Also disclosed is a quadrature polarized antenna array optimized for obtaining polarization information in the azimuth plane. Use of any of the above methods together with the quadrature polarized array provides improved location performance compared to use of the respective method alone.

The principles and operation of a smart antenna according to the present invention may be better understood with reference to the drawings and accompanying descriptions.

Before explaining embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a schematic diagram illustrating two cellular base stations and illustrating an advantage of the present embodiments. A first mobile base station 10 is in communication with a range of cellular telephones 12, 14 and 16. The base station 10 is unable to determine with great accuracy the direction from which the signals come due for example to the multipath effects of signals bouncing off buildings. Thus, the signals are not strongly directed. Reference numeral 18 indicates the space/power distribution of the various signals. As is apparent from the illustration, the direction of the secondary node of the signal to source 12 coincides with the direction of the main node to source 14. Such prevents sources 12 and 14 from using the same or otherwise interfering frequencies. It is not possible to use a narrower beam for either of the sources because the directions of the sources are not known accurately.

Base station 20 is able, in accordance with a preferred embodiment of the present invention, to determine with accuracy the direction of sources 22 and 24, as will be explained in detail below. Not only is it able to locate static sources but, as the location can be achieved in real time, even dynamic sources 22 and 24 can be tracked. Source 24 is a vehicle, which it is possible to track with a narrow beam, according to a preferred embodiment of the present invention.

Reference is now made to FIG. 2, which is a simplified diagram illustrating specific problems of cellular telephone base stations in the urban environment. FIG. 2a illustrates the coverage area of a base station over smooth uninterrupted terrain. FIG. 2b shows the coverage area of a directional antenna over smooth interrupted terrain. FIG. 2c shows the coverage area of a base station over urban terrain in which buildings provide obstacles to the free passage of signals. FIG. 2d shows the coverage area of a directional antenna over suburban terrain, that is to say with a lower density of building than that of FIG. 2c. Buildings in the urban and suburban environment cause signals to be blocked or reflected, and thus make signal source location difficult. The cellular base station may see the same signal approaching from several different directions, a phenomenon known as multipath error, or may not see the signal arrive at all. Current algorithms for source location tend to fail beyond two multipath errors.

The Antenna

FIGS. 3-7 show sensing antenna dipoles, and how they may be combined into a quadrature polarized antenna according to a first embodiment of the present invention.

Figure 4:
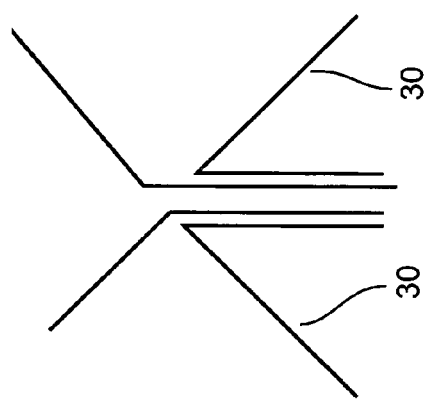
FIG. 4 is a simplified schematic illustration of two electrical dipoles arranged orthogonally.
Figure 3:
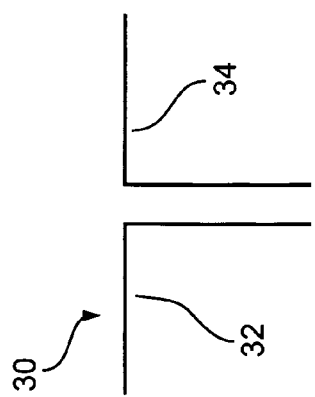
FIG. 3 is a simplified schematic illustration of an electrical dipole antenna.

Reference is now made to FIG. 3, which illustrates a typical electrical dipole. The dipole 30 comprises two laterally extending poles 32 and 34. In FIG. 4, two such dipoles 30 are placed together orthogonally.

Figure 5:
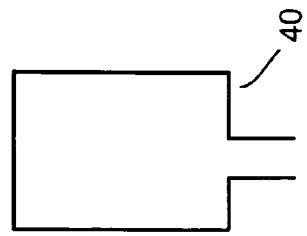
FIG. 5 is a simplified schematic illustration of a magnetic dipole.

Reference is now made to FIG. 5, which shows a typical magnetic dipole. The dipole 40 is formed by a single wire describing a rectangle.

Figure 6:
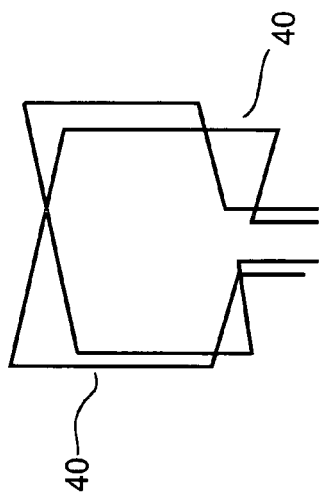
FIG. 6 is a simplified schematic illustration of two magnetic dipoles arranged orthogonally.

In FIG. 6, two magnetic dipoles are shown placed together orthogonally.

Figure 7:
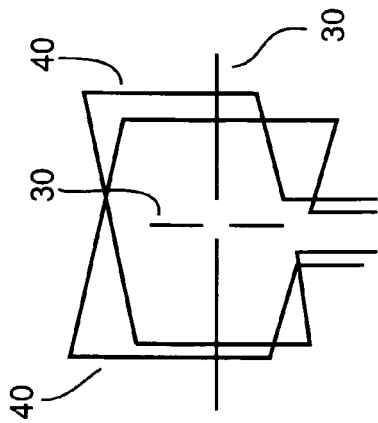
FIG. 7 is a simplified schematic illustration of an antenna unit comprising two orthogonally arranged electrical dipoles and two orthogonally arranged magnetic dipoles placed together according to a first preferred embodiment of the present invention.

Reference is now made to FIG. 7, which is a simplified diagram illustrating an antenna element according to a preferred embodiment of the present invention. Two electric dipoles 30 are placed together orthogonally as illustrated in FIG. 4. In addition, two magnetic dipoles 40 are also placed together orthogonally as shown in FIG. 6, together with the electrical dipoles to form an antenna element having four mutually orthogonal sensing dipoles. All four dipoles sense in the same plane. If the antenna is oriented as shown in the illustration then sensing is maximized in the azimuth or horizontal plane, and the sensors allow polarization information within the azimuth plane to be obtained. As may be appreciated, when considering cellular communication, most of such communication is limited to the azimuth plane. Cellular signals are polarized and thus polarization may be used as an additional parameter, as will be explained below, to eliminate multipath errors. Deviations from the azimuth plane can also be sensed although substantially vertical signals may be lost.

Vector Sensor Smoothing (VSS)

Figure 8:
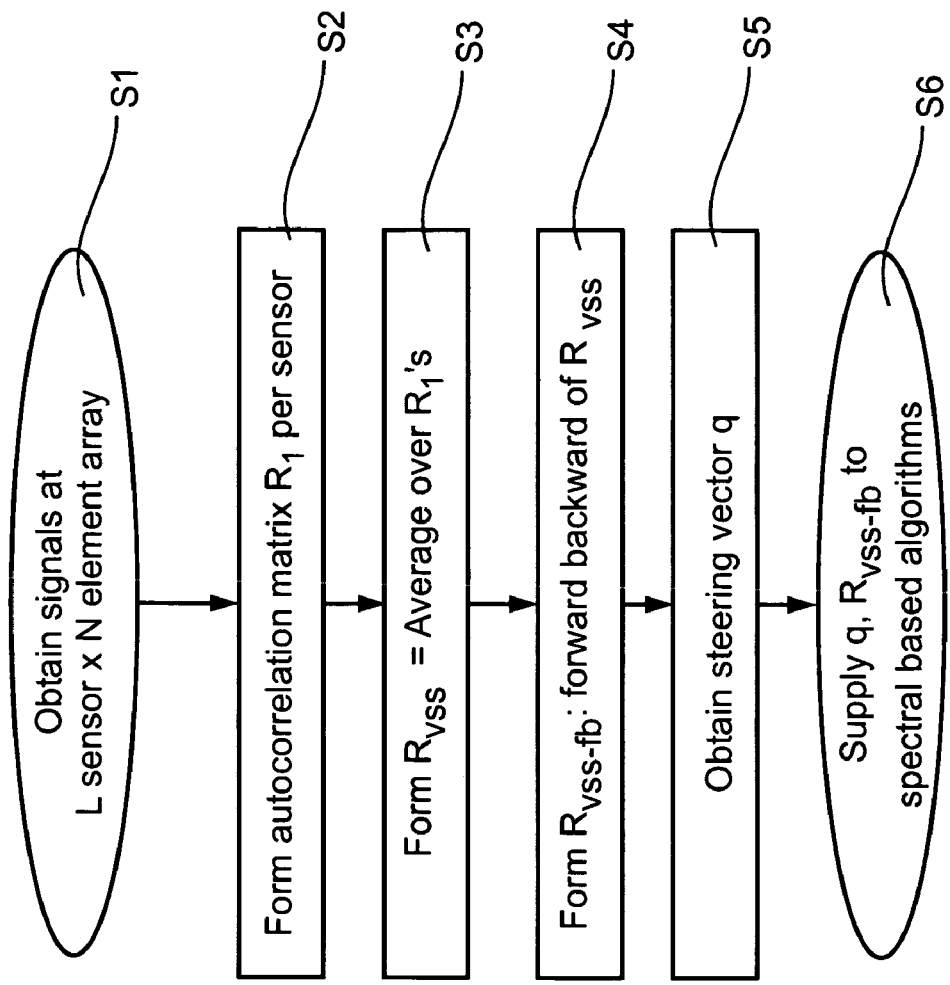
FIG. 8 is a simplified diagram showing a first preferred embodiment operative in accordance with the present invention, of a method for obtaining spatial information from an array of elements such as the element of FIG. 7.

Reference is now made to FIG. 8, which is a simplified diagram showing a first preferred embodiment of a method for obtaining spatial information from an array of elements such as the element of FIG. 7. In a stage S1, information is obtained from the various sensors and elements of the array. The data in each sensor is not exactly the same. That is to say for multipath versions from the same signal source the data carried by the signal remains the same but the specific parameter picked up by each individual dipole is different. If the dipoles are arranged to be orthogonal as in FIG. 7, and if the signal is polarized, then the amount of information is maximal. Then, in a stage S2, autocorrelation matrices are formulated for each of the sensor types, that is dipole configurations, in the array. That is to say, one autocorrelation matrix is formulated for electrical dipoles in a first sense, a second autocorrelation matrix is formulated for electrical dipoles in the orthogonal sense. A third autocorrelation matrix is formulated for magnetic dipoles in a first sense and a fourth autocorrelation matrix is formulated for magnetic dipoles in the orthogonal sense.

In a stage S3, an average is taken of the autocorrelation matrices, which is to say that the autocorrelation matrices are summed and then divided by the total number of matrices. The result is an extended covariance matrix and is referred to hereinbelow as $R_{vss}$ where vss refers to vector sensor smoothing.

An optional stage S4 follows of applying forward backward averaging to the matrix $R_{vss}$ to form $R_{vss-fb}$. Forward backward averaging is a method, known to the skilled person, for decorrelating signals, and reference was made thereto hereinabove. More particularly, forward backward: averaging is a process applied to the autocorrelation matrix using the complex conjugate of the autocorrelation matrix multiplied by anti-diagonal matrixes of both sides thereof. Mathematically forward backward averaging is carried out as follows:

$$R_{VSS-FB} = \frac{1}{2}(R_{VSS} + ZR_{VSS}^* Z)$$

where:

$$Z = \begin{bmatrix} 0 & \cdots & 0 & 1 \\ \vdots & & 1 & 0 \\ 0 & \cdot^{\cdot^{\cdot}} & & \vdots \\ 1 & 0 & \cdots & 0 \end{bmatrix}$$

The use of forward backward averaging is advantageous in that the maximum number of signal sources that can be localized is doubled. However, the forward backward averaging method assumes a symmetric array, far field approximation and unequal signal phases at the center of the array. Thus it is not always applicable. In general, for mobile telephone sources these assumptions, in particular that of the symmetric array, are true. If the assumptions are not true then it is advisable to use vector sensor smoothing without forward backward averaging. Other methods of decorrelating signals may also be considered.

In stage S5, a steering vector q, as defined in (14) below, is used. Although shown sequentially, stage S5 is independent of the immediately preceding stages and thus may be carried out in parallel to save processing time.

In stage S6, $R_{vss-fb}$ if available from stage S4, or otherwise $R_{vss}$, is passed on for the use of spectral based algorithms such as MUSIC and MVDR. The steering vector q is also passed on. Theoretically a steering vector could be generated from any of the autocorrelation matrices, that is to say for each of the sensor elements. Preferably, however, just a single steering vector q is passed on. Since all of the sensors obtain the same signal there is no significant difference between the steering vectors obtained from the different sensors.

The procedure described in stages 1-5 serve as a preprocessing stage for the spectral based algorithms, which then complete the task of characterizing multipath versions of the same signal.

Maximum Likelihood Estimation

Figure 9:
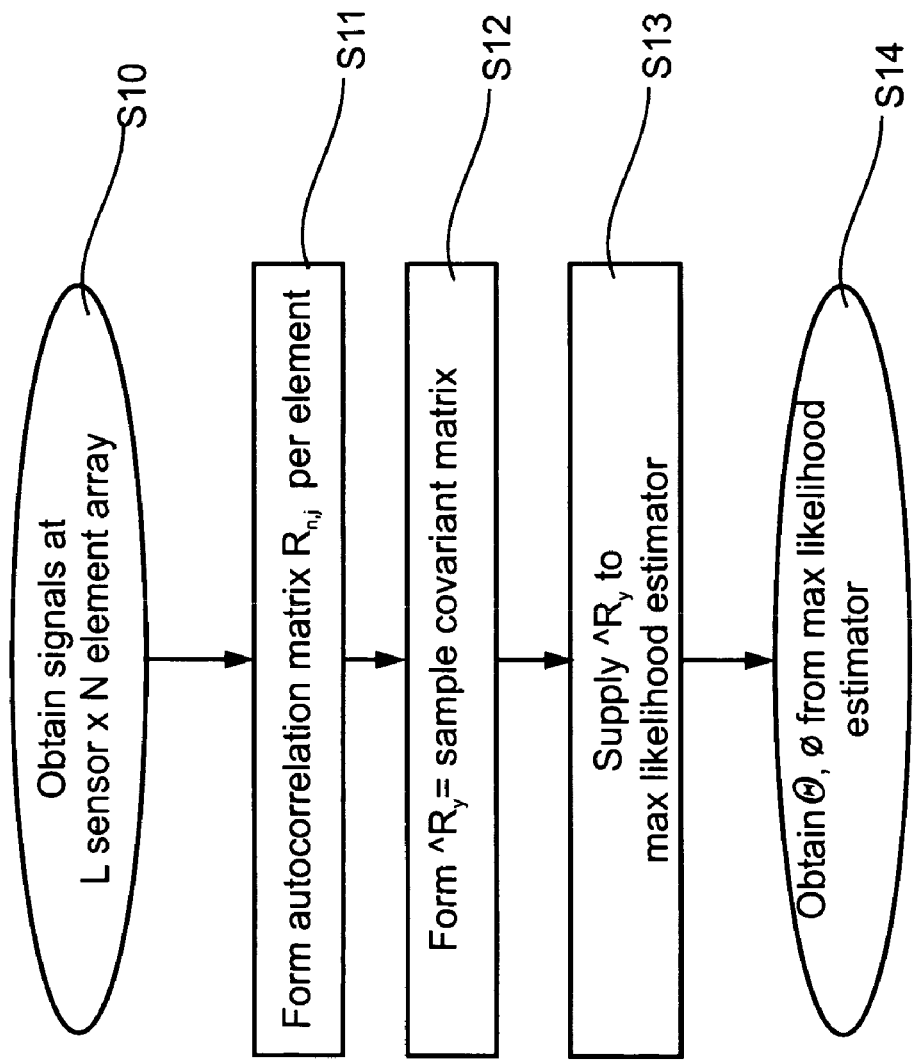
FIG. 9 is a simplified flow chart illustrating an alternative preferred embodiment, operative in accordance with the present invention, of preprocessing to obtain spatial information from an array of elements.

Reference is now made to FIG. 9, which is a simplified flow chart illustrating an alternative method of obtaining spatial information from an array of elements of the kind described above. In FIG. 9, a first stage S10 obtains information from the dipoles or sensors of an antenna array element of the kind shown in FIG. 7. In a stage S11, the information is autocorrelated over the individual elements, just as was done in the method of FIG. 8, to form autocorrelation matrices $R_{n,j}$. In a stage S12, a sample covariant matrix $\hat{R}_y$ is formulated. In a stage S13 the sample covariant matrix is supplied as an estimate to a maximum likelihood estimator. In a stage S14 the maximum likelihood estimator is used to obtain the direction of the source within the azimuth plane.

Comparison Between Methods

Maximum likelihood (ML) estimation achieves a greater accuracy than the VSS method of FIG. 8 and the Eigenstructure-based techniques, and approaches the Cramer Rao bound for maximum theoretical resolution. However ML is computationally expensive, especially for large numbers of incoming signals. For small numbers of incoming signals, including one, however, the computational cost is not that great and can be justified by the increased accuracy. Thus a preferred embodiment of a direction finder according to the present invention incorporates both a VSS estimator according to FIG. 8 and a maximum likelihood estimator according to FIG. 9 and chooses a suitable threshold of signal paths at which to swap between the two methods.

In any of the above embodiments it is possible to provide dedicated hardware for gathering data from individual sensors and individual elements in the array, and building the autocorrelation matrices therefrom. In an alternative embodiment it is possible to take data from the different sensors in turn or from different elements in turn using high-speed switching techniques. In a particularly preferred embodiment a single data gathering unit is used for each of the four sensors in each element and switching is provided between the sensors. Thus the antenna saves on hardware.

Cellular Telephony Using the Present Embodiments

Figure 10:
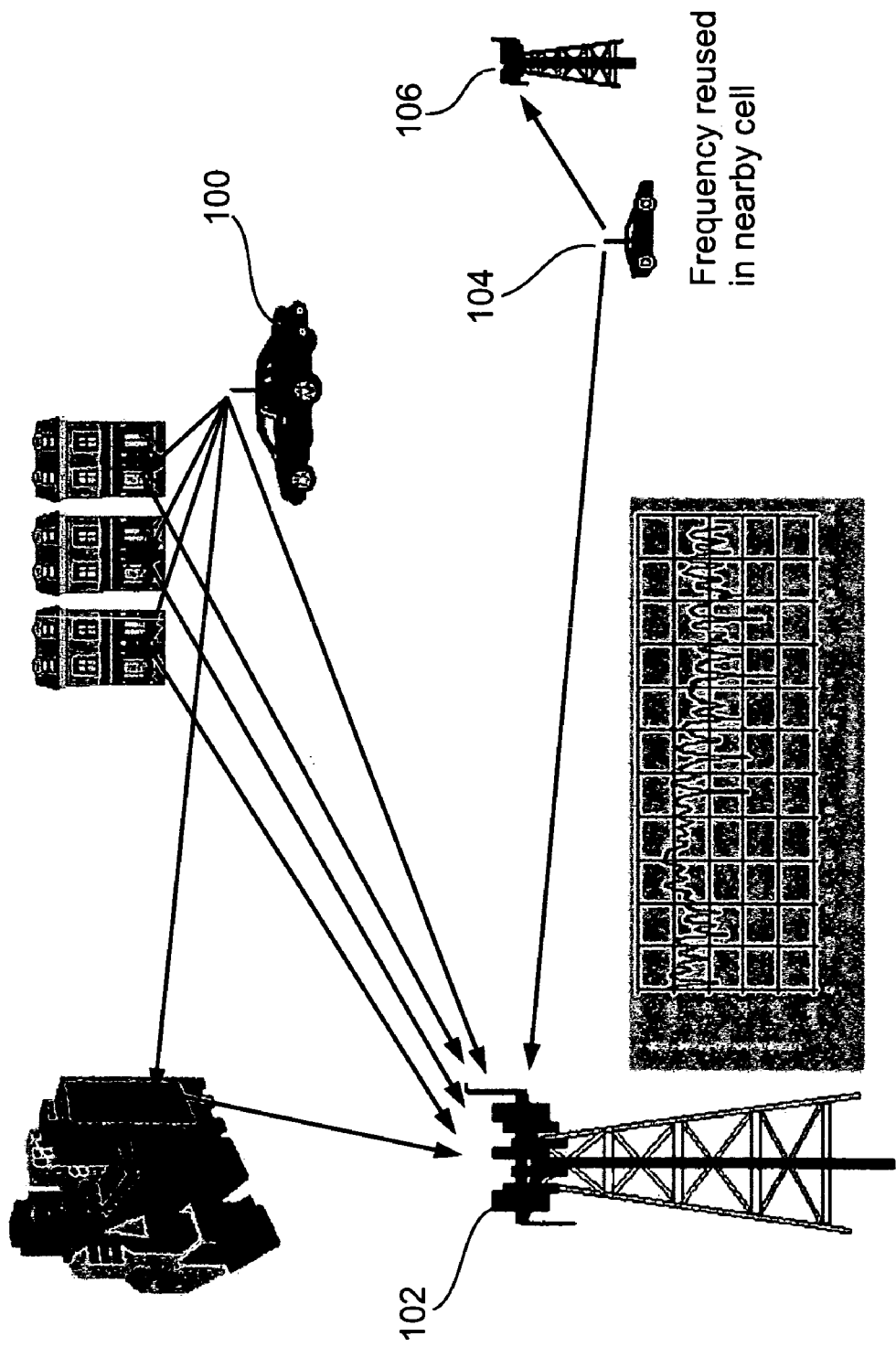
FIG. 10 is a simplified schematic diagram illustrating the advantages of accurate source location according to embodiments of the present invention, in a two source two base-station system with multiple path errors.

Reference is now made to FIG. 10, which is a schematic diagram illustrating the use of source location in the cellular telephony environment. As the base station is able to localize the source, the same channel can be reused in different directions, even where the directions are fairly close, and can certainly be reused by neighboring base stations. In FIG. 10, source 100 transmits a signal to base station 102. The signal reaches the base station via five different paths. Using the methods described above, the base station 102 is able to identify that a single source is responsible, locate the source and communicate with it using a relatively accurately directed beam. Source 104 is then able to use exactly the same channel to communicate with neighboring base station 106. The signal also manages to reach base station 102. Base station 102 does not mistakenly identify the signal with source 100 since the polarization is different. Thus no channel interference is created.

Such an antenna is also able to cancel a noise source by directing a null of a given channel towards an identified source of noise.

In the following, a mathematical description of the embodiments is provided. A measurement model using a vector sensor array is discussed. Then an ML estimator for DOA and polarization vectors is derived. The derivation is followed by the vector sensor smoothing (VSS) method as a preprocessing stage for eigen-structure based source localization. The performance of the proposed algorithms is evaluated via computer simulation and described.

Signal Characterization

We begin by considering the polarization of an incoming signal. Assume the incoming signal to be a planar wave incident from the direction $(\theta,\phi)$, where $\theta$ is the elevation angle and $\phi$ is the azimuth angle. The complex envelope of the transverse incident electric field can be expressed in spherical coordinate system by $$\underline{E} = E_\phi \hat{\phi} + E_\theta \hat{\theta} \tag{1}$$

where $E_\phi$ and $E_\theta$ are its horizontal and vertical components. For a given polarization, the electric field components at the sensor can be described by $$E_\phi(t) = \cos\gamma\, s(t) \tag{2}$$

and $$E_\theta(t) = A \sin\gamma\, e^{j\eta} s(t) \tag{3}$$

where A is the signal complex amplitude. The parameters $\gamma$ and $\eta$ determine the polarization and are related to the amplitude and phase of the horizontal and vertical components of the received signal. $s(t)$ is a base-band equivalent of the transmitted narrow band signal.

The electric field in (1) can be expressed in x, y, z Cartesian coordinate system by $$\underline{E} = (E_\theta\cos\theta\cos\phi - E_\phi\sin\phi)\hat{x} + (E_\theta\cos\theta\sin\phi + E_\phi\cos\phi)\hat{y} - (E_\theta\sin\theta)\hat{z} \tag{4}$$

By substitution of (2) and (3) into (4) one obtains $$E(t) = A[(\sin\gamma e^{j\eta}\cos\theta\cos\phi - \cos\gamma\sin\phi)\hat{x} + \tag{5}$$
$$(\sin\gamma e^{j\eta}\cos\theta\sin\phi + \cos\gamma\cos\phi)\hat{y} - (\sin\gamma e^{j\eta}\sin\theta)\hat{z}] s(t)$$

Any plane wave can be characterized by the angles of arrival $\theta,\phi$, the complex amplitude A, and the polarization parameters $\gamma$ and $\eta$.

The polarization parameters can be expressed by vector notation as $$p = \begin{bmatrix} p_\theta \\ p_\phi \end{bmatrix} = \begin{bmatrix} \sin\gamma e^{j\eta} \\ \cos\gamma \end{bmatrix}, \tag{6}$$

and $\underline{E}(t)$ can be rewritten in the form:

$$\underline{E}(t) = As(t)\{p_\theta[\hat{x}\cos\theta\cos\phi + \hat{y}\cos\theta\sin\phi - \hat{z}\sin\theta] + p_\phi[-\hat{x}\sin\phi + \hat{y}\cos\phi]\} \tag{7}$$

Similarly, the incident magnetic field is given by $$H(t) = \frac{1_r \times E(t)}{Z_0} \tag{8}$$

in which $Z_0$ is the characteristic impedance of the medium.

Array Vector Sensor Spatial Response to a Polarized Signal

1. Sensor Response

We now consider a general type of monopole or dipole sensor, which may be either electric or magnetic and linearly polarized. Let $V_x$, $V_y$, $V_z$ denote the sensor response to x, y, z components of an arbitrary incident electric or magnetic field. Accordingly, the total signal at the sensors output terminals could be described by $$g_E(\theta, \phi, p) = a_E(\theta, \phi)p = [a_\theta(\theta, \phi)\ \ a_\phi(\theta, \phi)]\begin{bmatrix} p_\theta \\ p_\phi \end{bmatrix} \tag{9}$$

and $$g_H(\theta, \phi, p) = a_H(\theta, \phi)p = [a_\phi(\theta, \phi)\ \ -a_\theta(\theta, \phi)]\begin{bmatrix} p_\theta \\ p_\phi \end{bmatrix}$$

in which the subscripts E and H stand for the electric and magnetic fields and $$a_\theta(\theta,\phi) = V_x \cos\theta\cos\phi + V_y \cos\theta\sin\phi - V_z \sin\theta \tag{10}$$

$$a_\phi(\theta,\phi) = -V_x \sin\phi + V_y \cos\phi$$

2. Vector Sensor Response

Figure 11:
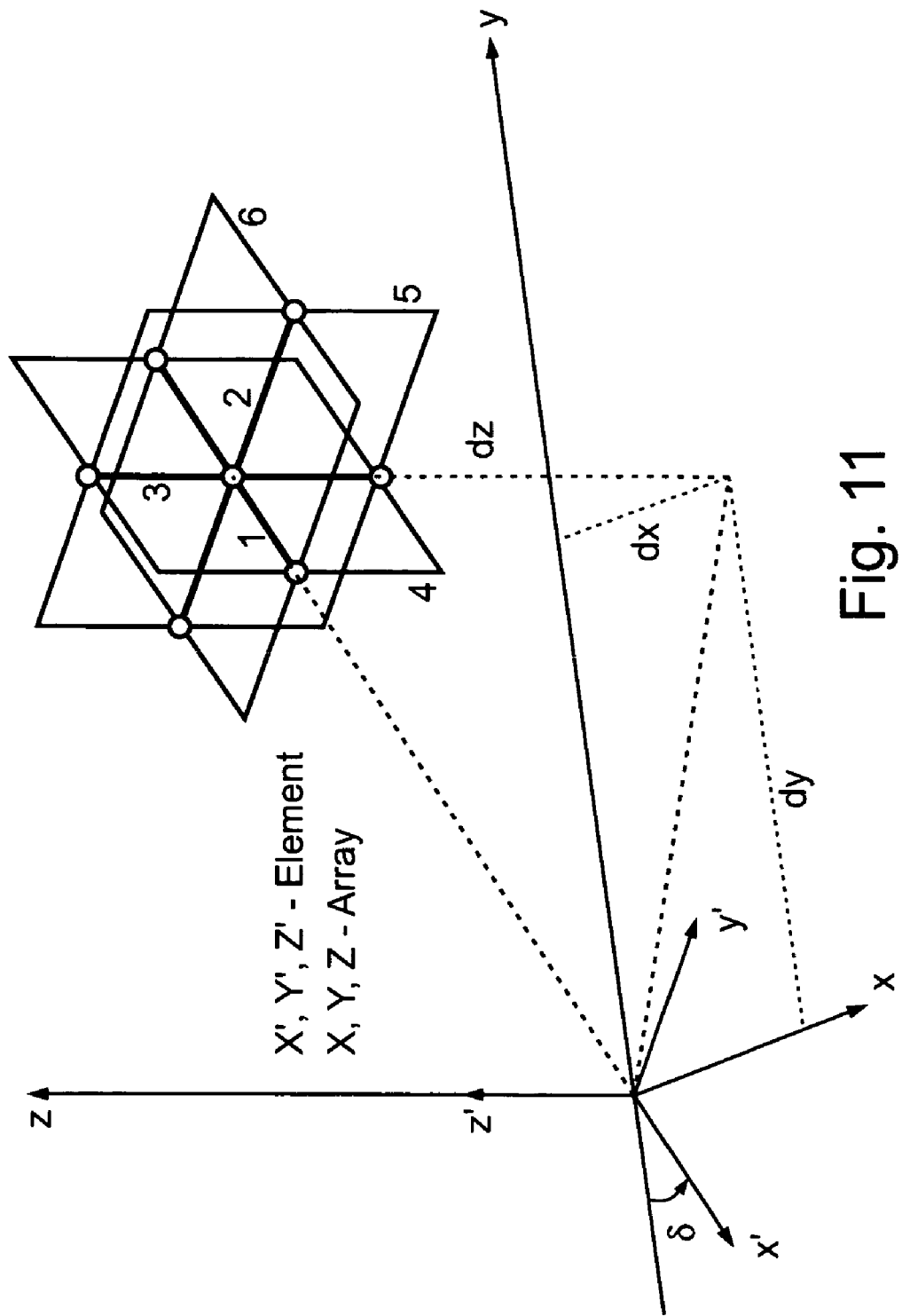
FIG. 11 is a simplified diagram illustrating the antenna array unit of FIG. 7 laid out on a three dimensional grid.

Reference is now made to FIG. 11, which shows a multiple orthogonal component sensor for probing both magnetic and electric elements in the three dimensional plane.

Consider a vector sensor containing 3 electric and 3 magnetic orthogonal sensors, located at $(x_0, y_0, z_0)$ and azimuthally rotated by an angle $\delta$, as depicted in FIG. 11. The coefficients $V_x$, $V_y$ and $V_z$ for these sensors are $$\text{electric sensors:} \begin{cases} V_{x1} = \sin(\delta) & V_{y1} = -\cos(\delta) & V_{z1} = 0 \\ V_{x2} = \cos(\delta) & V_{y2} = \sin(\delta) & V_{z2} = 0 \\ V_{x3} = 0 & V_{y3} = 0 & V_{z3} = 1 \end{cases} \tag{11}$$

$$\text{magnetic sensors:} \begin{cases} V_{x4} = w\cos(\delta) & V_{y4} = w\sin(\delta) & V_{z4} = 0 \\ V_{x5} = w\sin(\delta) & V_{y5} = -w\cos(\delta) & V_{z5} = 0 \\ V_{x6} = 0 & V_{y6} = 0 & V_{z6} = w \end{cases}$$

where w denotes the ratio between the induced voltage in an electrical sensor to the corresponding induced voltage in a magnetic sensor.

The spatial response in matrix notation of the vector sensor, shown in FIG. 11, can be expressed by $$g_0(\theta, \phi, p) = \underbrace{\begin{bmatrix} a_{\theta 1}(\theta, \phi) & a_{\phi 1}(\theta, \phi) \\ a_{\theta 2}(\theta, \phi) & a_{\phi 2}(\theta, \phi) \\ a_{\theta 3}(\theta, \phi) & a_{\phi 3}(\theta, \phi) \\ a_{\theta 4}(\theta, \phi) & -a_{\theta 4}(\theta, \phi) \\ a_{\phi 5}(\theta, \phi) & -a_{\theta 5}(\theta, \phi) \\ a_{\phi 6}(\theta, \phi) & -a_{\theta 6}(\theta, \phi) \end{bmatrix}}_{A(\theta,\phi)} \begin{bmatrix} p_\theta \\ p_\phi \end{bmatrix} \quad (12)$$

in which $a_{\phi k}(\theta,\phi)$, and $\alpha_{\theta k}(\theta,\phi)$ are defined in Eq. (10) for the kth sensor with the corresponding $V_{xk}$, $V_{yk}$ and $V_{zk}$. The polarization p is determined by two real parameters, $\gamma$ and $\eta$:

$$p = \begin{pmatrix} \sin\gamma e^{j\eta} \\ \cos\gamma \end{pmatrix}$$

as in equation (6) above

In general, a vector sensor may contain part of the six elements described hereinabove and therefore the corresponding spatial response vector size is given by $1 \leq L \leq 6$.

3. Array Vector Sensor Response

For the general case of a 3D array with N vector sensors, the spatial response in matrix notation of the array vector sensors is expressed by $$g(\theta, \phi, p) = q(\theta, \phi) \otimes g_0(\theta, \phi, p) = \underbrace{[q(\theta, \phi) \otimes A(\theta, \phi)]}_{F(\theta,\phi)} p \quad (13)$$

where $\otimes$ denotes the Kronecker product. The size of the vector $q(\theta,\phi)$ is N×1 and its elements represent the phase delay associated with each vector sensor in the array due to its relative location for an incident plane wave from the direction $(\theta,\phi)$:

$$q(\theta, \phi) = \begin{bmatrix} e^{jk_0[x_1\sin\theta\cos\phi + y_1\sin\theta\sin\phi + z_1\cos\theta]} \\ e^{jk_0[x_2\sin\theta\cos\phi + y_2\sin\theta\sin\phi + z_2\cos\theta]} \\ \vdots \\ e^{jk_0[x_N\sin\theta\cos\phi + y_N\sin\theta\sin\phi + z_N\cos\theta]} \end{bmatrix}, \quad (14)$$

and $k_0$ is the wave number in the medium.

The Measurement Model

Consider the scenario of M signals, $s_m(t)$, impinging on the array from directions $(\theta_m,\phi_m)$ and polarization vector $p_m$, where $m=1, \ldots, M$. The spatial response of the array to the mth signal is denoted by $g(\theta_m,\phi_m,p_m)$. Assuming K independent samples of the measurement vector, y(t), the data model is given by $$y(k) = \sum_{m=1}^{M} F(\theta_m, \phi_m, p_m)s_{mk} + n_k \quad (15)$$

where K is the number of independent samples collected by the array and $n_k$ represents the kth sample of the additive noise and interference vector.

The measurement and noise vectors, $y_k$ and $n_k$ are each of size LN, the matrix $F(\theta_m,\phi_m)$ is of size LN×2 whose columns denote the spatial transfer functions for both polarization components of the mth signal, and $p_m$ is a complex vector of size 2 describing the corresponding signal polarization state.

We assume that the noise vector, $\{n_k\}_{k=1}^{K}$, is an i.i.d. sequence with zero-mean, complex Gaussian distribution, $n_k \sim CN(0,R_n)$ and independent of the signals. The signals snapshots, $s_{mk}$, are assumed to be unknown deterministic. In case of coherent or correlated signals, they can be decomposed as $s_{mk}=\mu_m s_k$, $m=2, \ldots, M$, $k=1, \ldots, K$, where $\mu_m$ denotes the relative amplitude and phase of the mth signal. Thus, Eq. (15) can be rewritten in the form:

$$y_k = \sum_{m=1}^{M} F(\theta_m, \phi_m)\underbrace{p_m\mu_m s_k}_{\zeta_m} + n_k, \quad k = 1, \ldots, K. \quad (18)$$

By denoting $\zeta_m = p_m\mu_m$, the unknown parameters space is reduced to the source directions $\theta=(\theta_1, \ldots, \theta_M)^T$, $\phi=(\phi_1, \ldots, \phi_M)^T$, the modified signal polarization vector, $\zeta=(\zeta_1^T, \ldots, \zeta_M^T)^T$, and the signal $s=(s_1, \ldots, s_k)^T$. Eq. (18) can be rewritten in short form notation as $$y_k = F_T(\theta,\phi)\zeta s_k + n_k, \quad k=1, \ldots, K$$

where $$\zeta = [\zeta_1^T \zeta_2^T \ldots \zeta_M^T]^T \quad (19)$$

and $$F_T(\theta,\phi) = [F(\theta_1,\phi_1)F(\theta_2,\phi_2) \ldots F(\theta_M,\phi_M)] \quad (20)$$

The problem of localizing the signal source is to estimate the directions of arrival, $(\theta_m,\phi_m)$, while the signal vector $s=(s_1, \ldots s_K)^T$ and the vector of the modified signal polarizations of the M arrivals $\zeta$ are unknown complex vector parameters.

Algorithm

The Maximum Likelihood Estimator

In this section, the ML estimator is derived for the problem stated in the previous section. Under mild regularity conditions, the ML estimator asymptotically achieves the Cramer-Rao Lower Bound (CRLB), as the number of snapshots goes to infinity.

The ML estimator of the source location is given by $$\hat{\theta}, \hat{\phi} = \underset{\theta,\phi}{\mathrm{argmax}}\{L_y(\theta, \phi)\} \quad (21)$$

where $L_y(\theta,\phi)$ is the localization function, defined as $$L_y(\theta, \phi) = \max_{\varsigma,s} L_y(\theta, \phi, \varsigma, s) \quad (22)$$

and $L_y(\theta,\phi,\zeta,s)=\log f(y_1, \ldots y_K/\theta,\phi,\zeta,s)$ is the conditional probability density function (pdf) of the measurements $y_1, \ldots, y_K$ given the unknown parameters $\theta, \phi, \zeta$ and $s$.

Considering the assumptions stated in the previous section, $y_1, \ldots, y_K$ is an i.i.d. sequence with $$y_k \sim CN\left(\underset{\xi(\theta,\phi,\varsigma)}{\underline{\zeta(\theta, \phi, \varsigma)}}, R_n\right).$$

Accordingly, $$L_y(\theta, \phi, \varsigma, s) = \quad (23)$$
$$-K\log(\pi|R_n|) - \sum_{k=1}^{K}(y_k - \xi(\theta, \phi, \varsigma)s_k)^H R_n^{-1}(y_k - \xi(\theta, \phi, \varsigma)s_k)$$

The ML estimator of the signal vector, s, can be obtained by equating the corresponding derivative of the log-likelihood function to zero, which results in $$\hat{s}_k = (\xi^H R_n^{-1} \xi)^{-1} \xi^H R_n^{-1} y_k \quad (24)$$

Substitution of (24) into (23) yields $$L_y(\theta, \phi, \varsigma, \hat{s}) = -K\log(\pi|R_n|) - \sum_{k=1}^{K} y_k^H R_n^{-1} y_k + K \frac{\xi^H R_n^{-1} \hat{R}_y R_n^{-1} \xi}{\xi^H R_n^{-1} \xi}. \quad (26)$$

By denoting:

$$\Psi_1(\theta,\phi)=F_T^H(\theta,\phi)R_n^{-1}F_T(\theta,\phi)$$

$$\Psi_2(\theta,\phi)=F_T^H(\theta,\phi)R_n^{-1}\hat{R}_y R_n^{-1}F_T(\theta,\phi)$$

and using the definition $\xi=F_T(\theta,\phi)\zeta$, we obtain a simplified form of Eq. (26):

$$L_y(y_1, \ldots, y_K | \theta, \phi, \varsigma, \hat{s}) = C + K \frac{\varsigma^H \psi_2(\theta, \phi)\varsigma}{\varsigma^H \psi_1(\theta, \phi)\varsigma} \quad (27)$$

Maximization of the log-likelihood function in Eq. (27) with respect to the modified polarization vector, $\zeta$, is equivalent to finding the following maximum generalized eigenvector and corresponding eigenvalue:

$$\{\Psi_2(\theta,\phi)u=\lambda\Psi_1(\theta,\phi)u\} \quad (28)$$

Thus $$L_y(\theta,\phi,\hat{\zeta},\hat{s}=C=K\lambda_{max}\{\Psi_2(\theta,\phi),\Psi_1(\theta,\phi)\} \quad (29)$$

$$\hat{\zeta}=u_{max}(\Psi_2(\hat{\theta},\hat{\phi}),\Psi_1(\hat{\theta},\hat{\phi})) \quad (29.1)$$

where $\lambda_{max}\{\Psi_2,\Psi_1\}$ and $u_{max}\{\Psi_2,\Psi_1\}$ stand for the maximum generalized eigenvalue and the corresponding eigenvector of the matrix pencil $(\Psi_2(\theta,\phi),\Psi_1(\theta,\phi))$, respectively.

Finally, the ML estimator of the signal DOA's is given by $$(\hat{\theta}, \hat{\phi}) = \underset{\theta,\phi}{\mathrm{argmax}}\lambda_{max}(\Psi_2(\theta, \phi), \Psi_1(\theta, \phi)) \quad (30)$$

and the estimate of the polarization vectors is given by the corresponding generalized eigenvector, $$\hat{\zeta}=u_{max}(\Psi_2(\hat{\theta},\hat{\phi}),\Psi_1(\hat{\theta},\hat{\phi}))$$

The ML estimate of the signal can now be written as $$\hat{s}_k = \frac{\hat{\zeta}^H F_T^H(\hat{\theta}, \hat{\phi}) R_n^{-1} y_k}{\hat{\zeta}^H F_T^H(\hat{\theta}, \hat{\phi}) R_n^{-1} F_T(\hat{\theta}, \hat{\phi})\hat{\zeta}}, \quad k = 1, \ldots, K$$

The ML estimator is known to be asymptotically optimal, however it involves a 2M dimensional search procedure for estimating $(\theta,\phi)$. Therefore, when M is large, the ML estimator is computationally expensive, and requires to be solved numerically. Note that in contrast the ML estimator derived above does not involve any search procedure over the polarization vector.

Eigenstructure-based techniques such as MUSIC and ESPRIT are computationally efficient for estimating source directions in a multi-source environment. These algorithms assume uncorrelated or partially correlated signals. In the following, a processing method is provided for utilizing eigenstructure-based techniques in the presence of fully correlated signals.

The Vector Sensor Averaging (VSS) Algorithm

Eigenstructure-based techniques for source localization, such as MUSIC, rely on identification of the signal and noise subspaces. In the presence of fully correlated signals the dimension of the signal subspace is smaller than the number of signals, M, and therefore, the signal subspace does not span the M-dimensional subspace of the spatial transfer functions, $g(\theta_1,\phi_1,p_1), \ldots, g(\theta_M,\phi_M,p_M)$. In this case, it is required to employ the information on the structure of the spatial transfer function, $g(\theta,\phi,p)$, in order to determine the spatial transfer functions subspace. Spatial smoothing, forward backward averaging and redundancy averaging methods utilize the information on the structure of the spatial transfer function in order to estimate this subspace or part of it. The deficiency of the spatial smoothing method is the reduction of the effective array aperture length resulting in lower resolution and accuracy, while the deficiency of the redundancy averaging method is that its estimation errors bias does not vanish asymptotically for large numbers of measurements. In addition, both approaches are limited to the case of a linear equally spaced (LES) sensor array with far-field approximation. The forward backward averaging method assumes a symmetric array, far field approximation and unequal signal phases at the center of the array.

In the methods of the present embodiments the vector sensor information is used in order to determine the subspace spanned by the steering vectors $q(\theta_1,\phi_1), \ldots, q(\theta_M,\theta_M)$, which enables estimation of direction of arrivals using eigen-structured-based methods, such as MUSIC. This objective can be obtained by Vector Sensor Averaging (VSS) method as described below.

By substitution of eqn. (13) into eqn. (16) the measurement model at the array can be written in the form $$y_k = \sum_{m=1}^{M} [q(\theta_m, \phi_m) \otimes A(\theta_m, \phi_m)]\varsigma_m s_k + n_k, \quad k = 1, \ldots, K \quad (31)$$

If we consider only the sensors of type l ($1 \leq l \leq L$), then the corresponding measurement vector, $y_{lk}$, can be expressed as $$y_{lk} = \sum_{m=1}^{M} [q(\theta_m, \phi_m) \otimes A_l(\theta_m, \phi_m)]\varsigma_m s_k + n_{lk}, \quad (32)$$
$$k = 1, \ldots, K, \quad l = 1, \ldots, L$$

which can be simplified to $$y_{lk} = \sum_{m=1}^{M} q(\theta_m, \phi_m) z_{ml} s_k + n_{lk}, \quad k = 1, \ldots, K, \quad l = 1, \ldots, L \quad (33)$$

where $A_l(\theta_m,\phi_m)$ is the lth row of the matrix $A(\theta_m,\phi_m)$, $z_{ml}=A_l(\theta_m,\phi_m)\zeta_m$ denotes the response of the lth type sensor for DOA $(\theta_m,\phi_m)$, and $n_{lk}$ stands for the corresponding noise vector.

Eq. (33) implies that each type of sensor array measurements provides a different linear combination of the vectors $q(\theta_1, \phi_1), \ldots, q(\theta_M,\phi_m)$, as it would be the case for non-coherent signals.

The information acquired by the L different sensor types helps to obtain a measurement space in which the signals are not fully correlated. We utilize this fact in order to span the signal subspace, which is a necessary requirement of the eigenstructured based algorithms for source localization.

Eq. (33) can be rewritten in matrix form as $$y_{lk} = Q(\theta,\phi)z_l s_k + n_{lk}, k=1,\ldots,K, l=1,\ldots,L \quad (34)$$

where $Q(\theta,\phi)=[q(\theta_1,\phi_1), \ldots, q(\theta_M,\phi_M)]$ and $z_l = [z_{1l}, \ldots, z_{Ml}]^T$.

Therefore, the covariance matrix of each sensor type is given by $$R_{yl} = E[y_{lk} y_{lk}^H] = \sigma_s^2 Q z_l z_l^H Q^H + R_{nl} \quad l=1 \ldots L \quad (35)$$

in which $\sigma_s^2$ denotes the signal power. The signal power is given by $\sigma_s^2 = E[|s_k|^2]$ and $R_{nl}$ denotes the corresponding noise covariance matrix. In this problem, the M signals are fully correlated. Accordingly, the signal covariance matrix of each sensor array type, $\sigma_s^2 Q z_l z_l^H Q^H$ is of rank one. In the VSS technique of the present embodiments, the covariance matrices $\{R_{yl}\}_{l=1}^L$, are smoothed for the L elements of the vector sensor. Consequently, the signal subspace is extended by averaging the L sensor type covariance matrices, i.e.

$$R = \frac{1}{L}\sum_{l=1}^{L} R_{yl} = \sigma_s^2 Q R_z Q^H + \frac{1}{L}\sum_{l=1}^{L} R_{nl} \quad (36)$$

in which $R_z$ is defined as $$R_z = \frac{1}{L}\sum_{l=1}^{L} z_l z_l^H.$$

The rank of the new signal covariance matrix $\sigma_s^2 Q R_z Q^H$ is limited by $\min(\text{rank}(R_z),M)$. Algorithms such as MUSIC, ESPRIT, etc, can use the corresponding sample covariance matrix, $$\hat{R} = \frac{1}{KL}\sum_{l=1}^{L}\sum_{k=1}^{K} y_{lk} y_{lk}^H,$$

with steering function $q(\theta,\phi)$ for source localization.

For determination of the M dimensional signal subspace, it is required that $M \leq \min(L,N)$. This requirement can be alleviated if one can use other methods for signal decorrelation. For example, by applying the Forward-Backward averaging referred to above, the maximum number of the fully correlated signals, which can be localized, is doubled.

The vector sensor array contains NL sensors and therefore NL receivers are required for data collection. However the VSS computes the smoothed covariance matrix by averaging the N×N matrices $\{R_{yl}\}_{l=1}^L$. In stationary scenarios the aforementioned matrices may be calculated for different periods, implying that one can use N receivers to collect the required data. Such may be achieved by use of a switching scheme.

Figure 12:
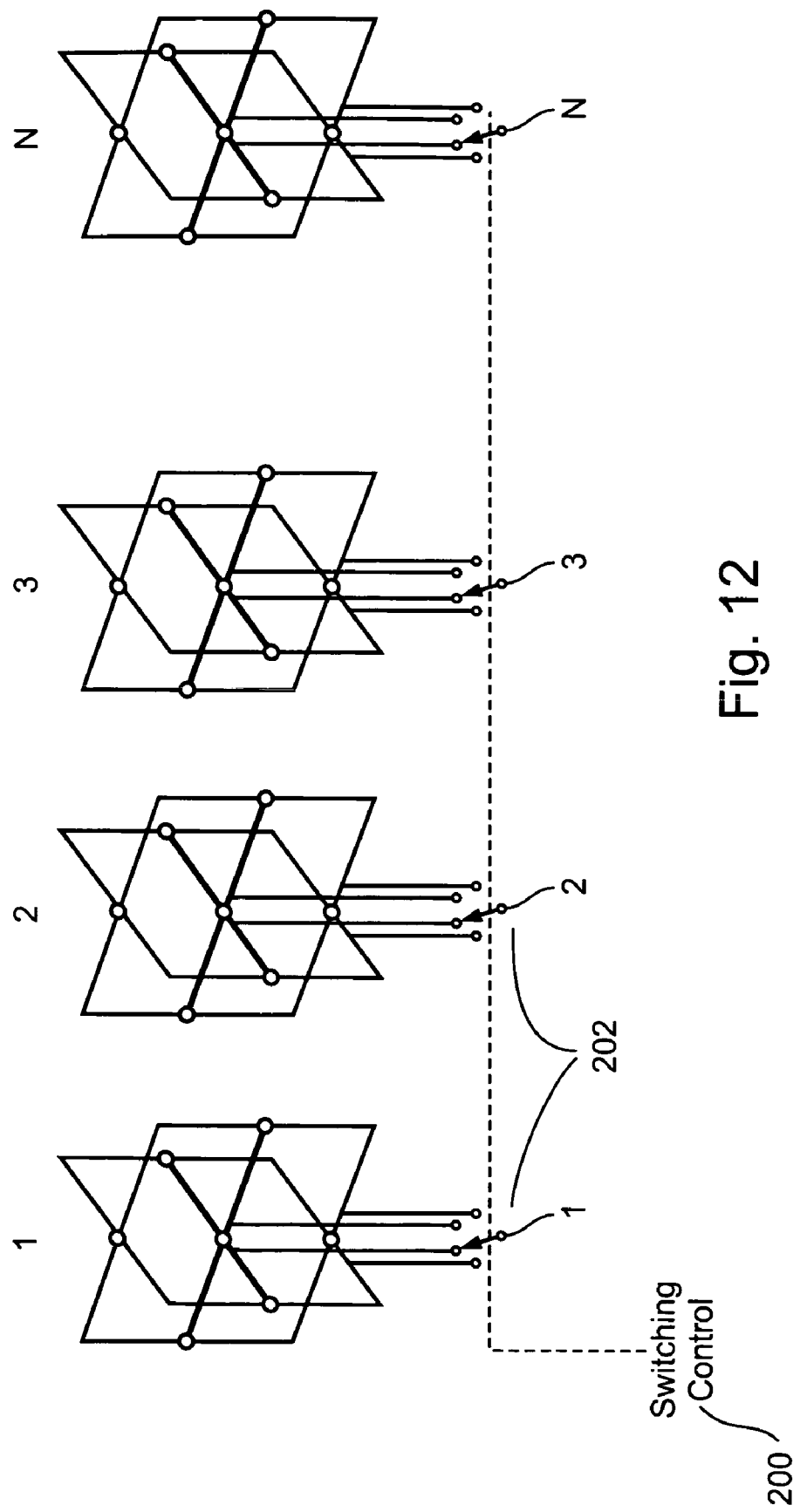
FIG. 12 is a simplified diagram illustrating switching between the antenna elements.

Reference is now made to FIG. 12, which is a simplified diagram illustrating switching between the elements. Switching control unit 200 controls switches 202 provided at each of the sensor elements 1 . . . 4 to switch between the different dipole outlets at the signals. The signals detected as the switches cycle between the different dipoles are recorded sequentially into matrix positions ready for the subsequent processing stages. The use of switches in this manner greatly simplifies the input aspect of the system.

Simulation

Simulations were carried out to evaluate the performance of techniques according to the various above-described embodiments, that is to say for different vector sensor types. Performance was evaluated for different scenarios. Signal environments consisting of coherent multipath were simulated on the computer in order to verify the assertions of the previous sections.

Simulations are presented for the following: 1) no preprocessing, 2) forward-backward averaging (FB), 3) VSS, and 4) VSS combined with FB (VSS-FB). The Cramer Rao bound (CRB) for source localization using a vector sensor array was derived in A. Nehorai and E. Paldi, "Vector-sensor array processing for electromagnetic source localization," IEEE Trans. on Signal Processing, vol. 42, pp. 376-398, February 1994, the contents of which are hereby incorporated by reference.

The arrays used for simulations are twelve-elements linear arrays of vector sensors at half-wavelength inter-element spacing along the y-axis. Three kinds of arrays are used:
 a. Vertical polarized sensor array—Each antenna element consists of a vertical electric sensor (FIG. 3). This is the scalar sensor case and VSS preprocessing cannot be applied.
 b. Dual polarized array—The vector sensors consist of vertical and horizontal electric dipoles (FIG. 4 with δ=0° according to FIG. 11).
 c. Quadrature polarized vector sensor array The vector sensors consist of four orthogonal components: two orthogonal electric dipoles and two orthogonal magnetic dipoles (sensors number 1, 2, 4, and 5 with δ=45° according to Eq. (11), assuming w=1).
 d. In the simulations it was assumed that the sources were in the azimuth plane, that is θ=90°.

In the first scenario, two equal power, fully correlated sources with DOA's 4°, 0°, and elliptical polarizations $p_1=(0.707e^{j60°}, 0.707)$, $p_2=(0.707e^{j80°}, 0.707)$ were considered. The phase difference between the two incident signals at the origin was 110° such that $\zeta_1=(0.7.7e^{j50°}, 0.707e^{j110°})$, $\zeta_2=(0.707e^{j80°}, 0.707)$. The number of samples taken from the array was 100.

Figure 13:
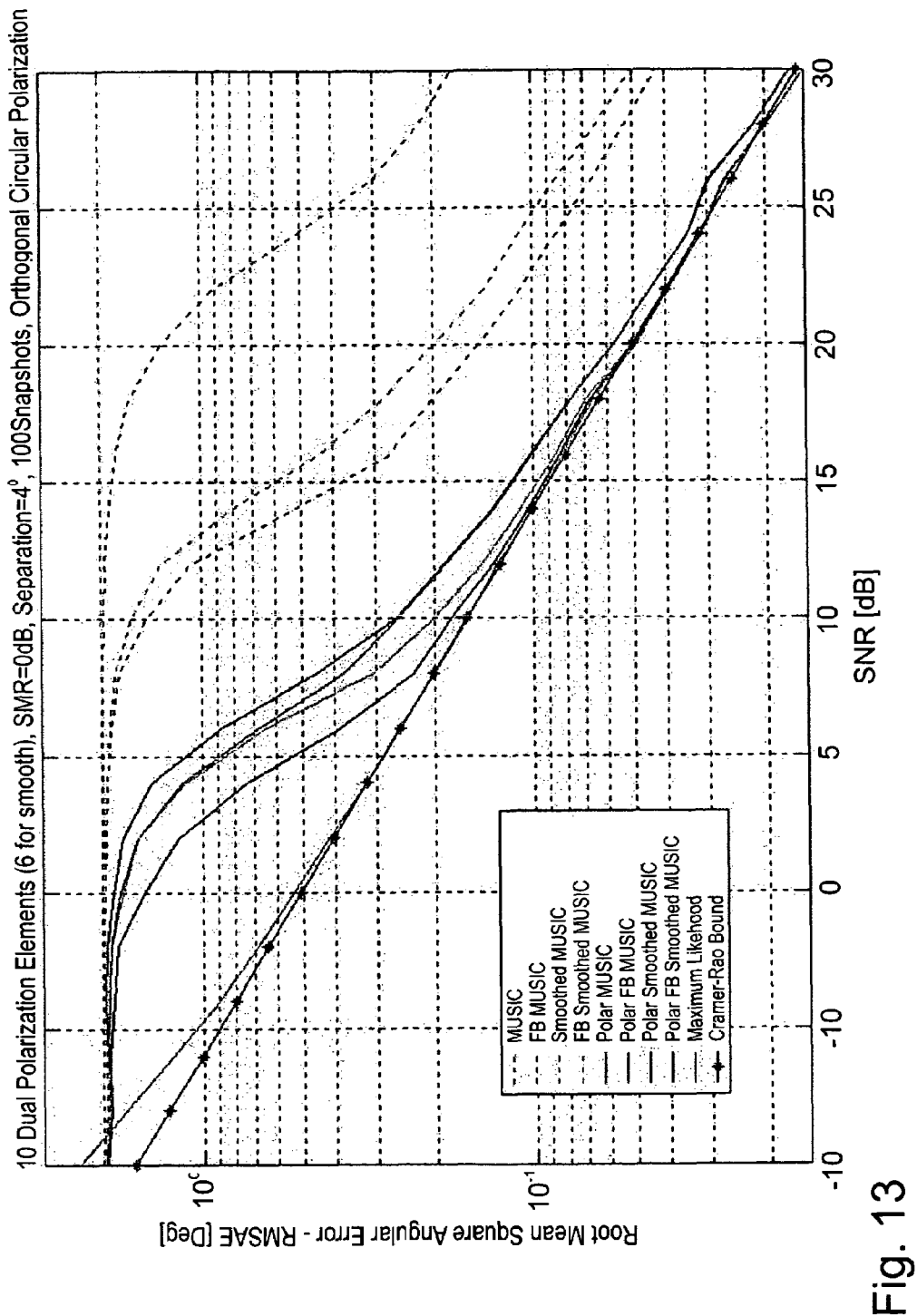
FIG. 13 is a graph that compares results based on a batch of 100 data samples (snapshots), for different decorrelation methods including those in accordance with the present invention.

Reference is now made to FIG. 13, which is a graph that compares results of the above-described scenario for different decorrelation methods and also shows the Cramer Rao bound. The root mean square error (RSME) versus signal to noise ratio (SNR) is depicted. It can be seen that RSME of the FB-MUSIC decreases as the SNR increases, but it is not an efficient estimator even asymptotically. MUSIC with no preprocessing fails as expected with in the case of fully correlated sources.

It is clear that VH MUSIC and FB MUSIC algorithms have the ability to decompose the coherent sources while the MUSIC algorithm by itself does not. The graph also shows that the ML can reach the Cramer Rao Bound (CRB).

Figure 14:
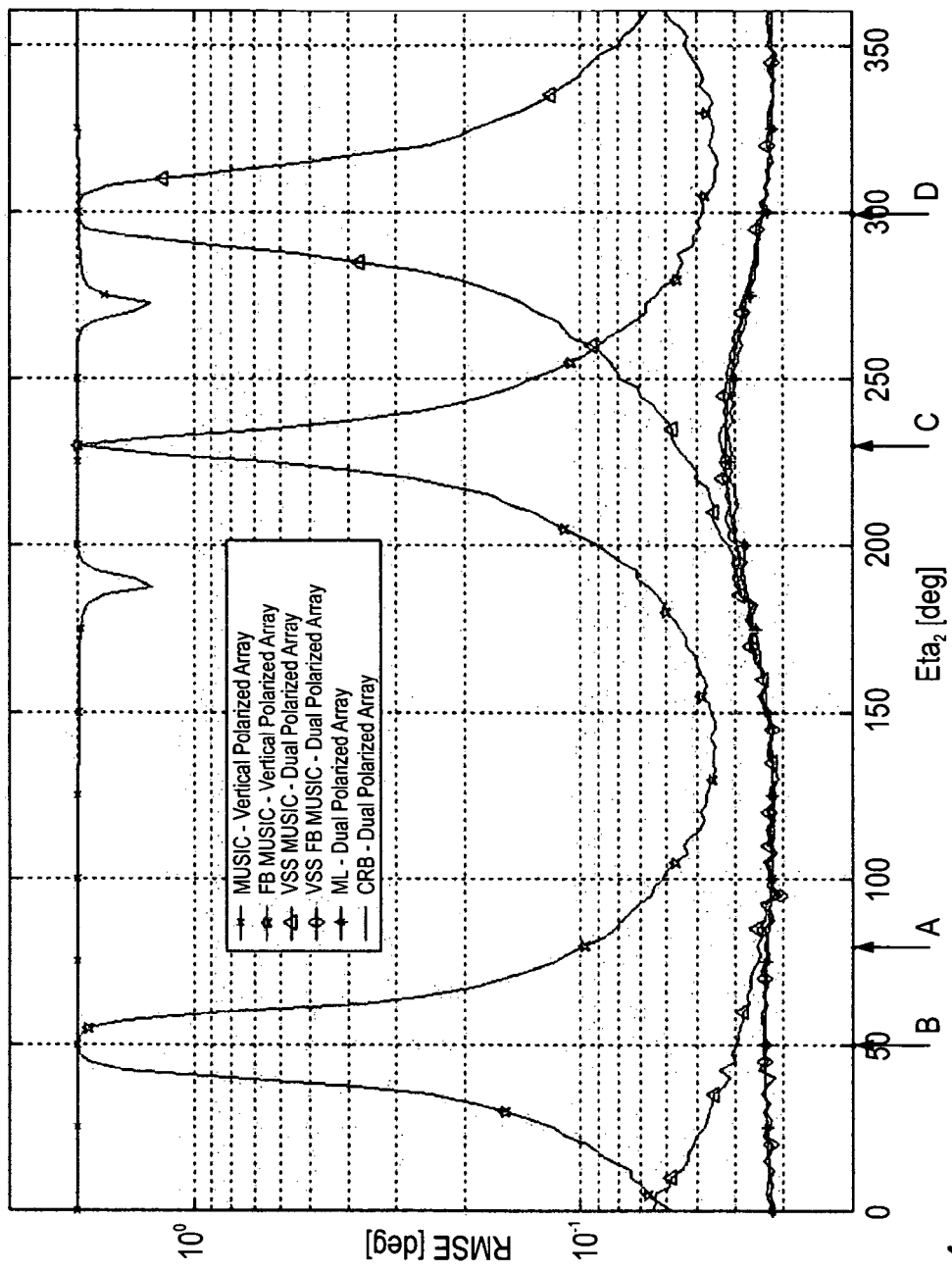
FIG. 14, is a further graph showing simulation results, and shows RSME versus angle $\eta_2$ at SNR=20 dB.

Reference is now made to FIG. 14, which is a graph presenting RSME versus the angle $\eta_2$ at SNR=20 dB for three different kinds of vector sensors, and three different types of preprocessing. The point A in FIG. 14 is the point in FIG. 13 at SNR=20 dB. For this purpose the same scenario as used in FIG. 13 above is used with the SNR set to 20 dB and the RMSE is plotted as a function of the polarization parameter $\eta_2$, see equation (6) above, where the subscript 2 refers to the number of the source. From FIG. 14, it is clear that the FB MUSIC fails around two points, labeled B and C, which reflect cases in which the phase difference of the two signals at the array center is 0 or 180 degrees. At point D, where the polarizations of the two sources observed at the output of the array are proportional to each other, the VH MUSIC fails. It is noted that in the above scenario, the absolute values of both polarization vectors were chosen to be identical. In practice, multi-path versions of the same signal do not usually have the same amplitude. In general cases, in which the polarization vectors are not identical, the limitation does not exist. The VSS FB MUSIC algorithm, which is a combination of VSS MUSIC and FB MUSIC, the above problem does not exist, since when the FB preprocessing fails to remove the singularity in the signal covariance matrix, it is removed by the VSS preprocessing and vice versa. The VSS-FB algorithm gives CRB resolution, as does the ML.

Figure 15:
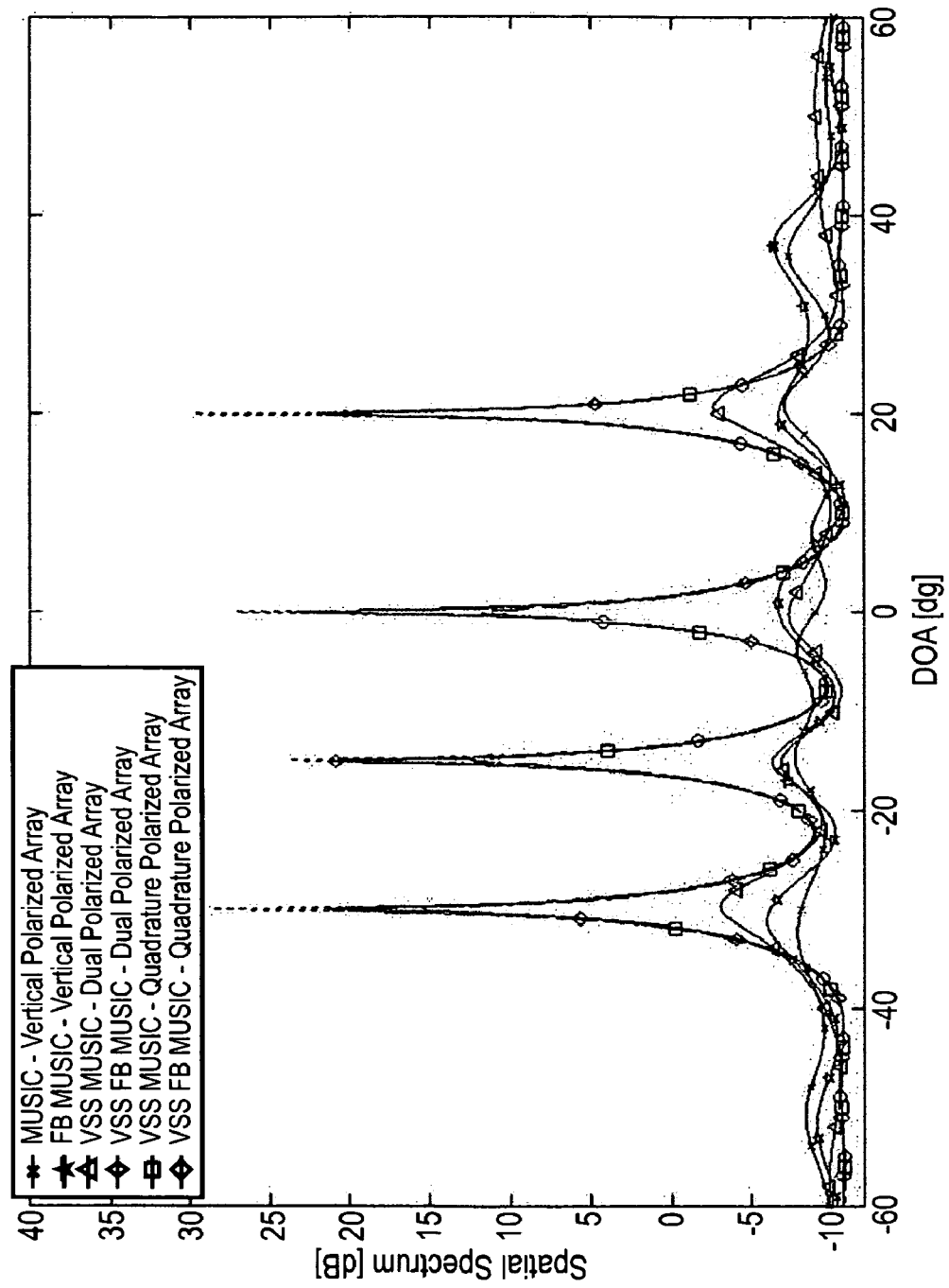
FIG. 15 is a further graph showing simulation results, in particular the case of 4 coherent sources arriving from directions −30°, −15°, 0° and 20° having different polarizations.

Reference is now made to FIG. 15, which is a graph comparing four equal power, fully correlated signals with DOAs of −30, −10 0 and 20 degrees and randomly chosen polarization. The SNRs of all the signals were 15 dB and 100 snapshots were collected from the array. The MUSIC and FB-MUSIC algorithms were applied to an array with vector sensors of type A, while the VSS and -MUSIC and VSS-FB-MUSIC algorithms were applied to an array of vector sensors of types B and C. As expected, one can observe that using an array of type A, MUSIC and FB-MUSIC fail to resolve the signal DOA's. sicne the VSS preprocessing in this case is unable to increase the rank of the signal covariance matrix to 4 as required to resolve four sources. By contrast, the VSS-FB-MUSIC with vector sensor of type B, and VSS-MUSIC and VSS-FB-MUSIC with vector sensors of type C are able to resolve the four fully correlated signals.

Figure 16:
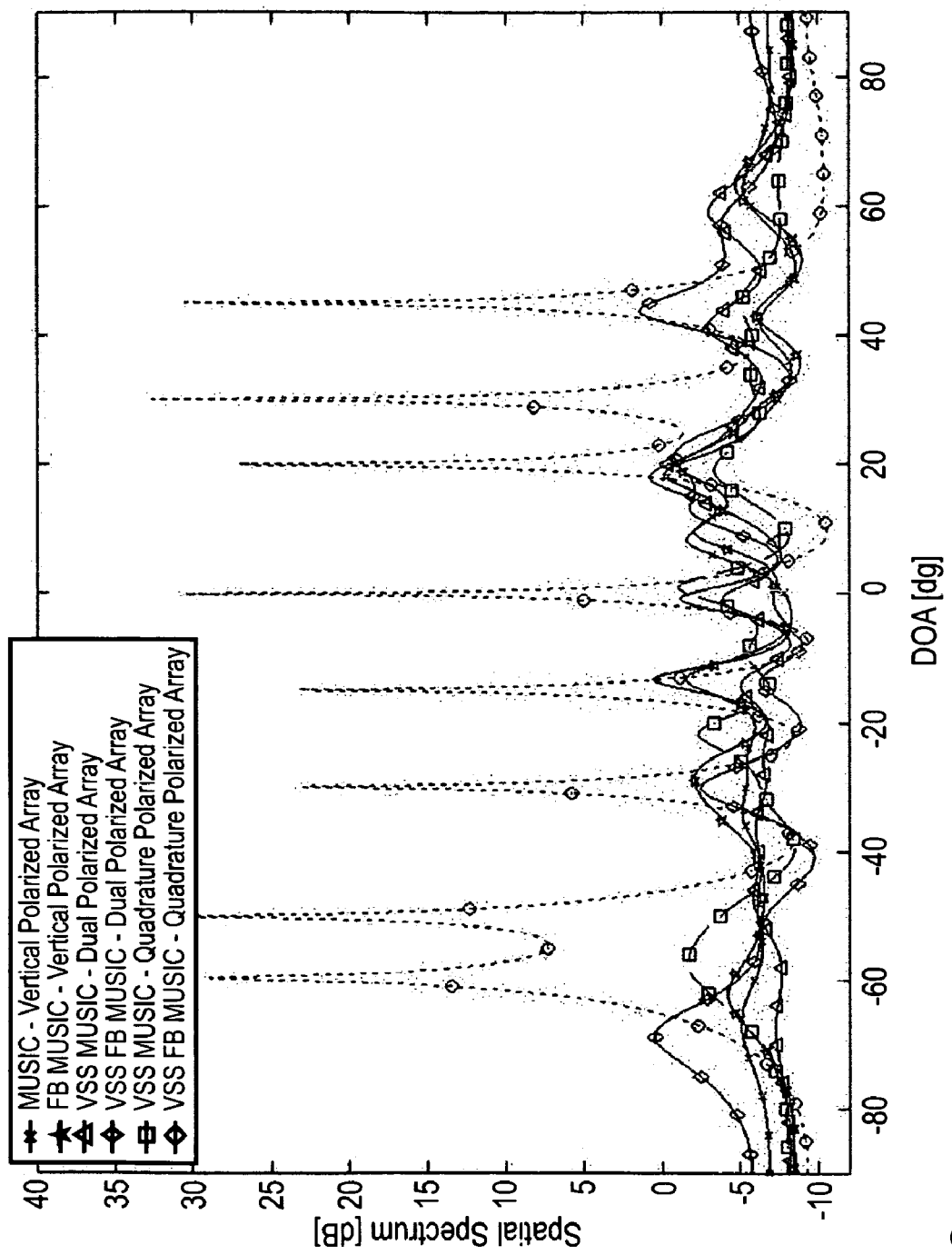
FIG. 16, is a further graph showing simulation results, in this case showing results using four additional coherent sources from directions −60°, −50°, 30° and 45° and giving a total of eight coherent sources which are successfully identified as being coherent by embodiments of the present invention but not by the prior art.

Reference is now made to FIG. 16, which shows results using four additional coherent sources, that is eight sources, from directions −70°, −50°, 30°, −10°, 0°, 20° 40° and 60°. From the figure we can see that only the VSS FB MUSIC with type c sensor, can resolve 8 coherent sources. All other cases fail. In the case of vector sensing using a quadrature array of type C, the VSS preprocessing results in a signal correlation matrix of rank 4. An additional FB preprocessing stage doubles the rank of the signal correlation matrix, in this case to 8, which is sufficient to allow the 8 sources to be resolved.

Figure 17:
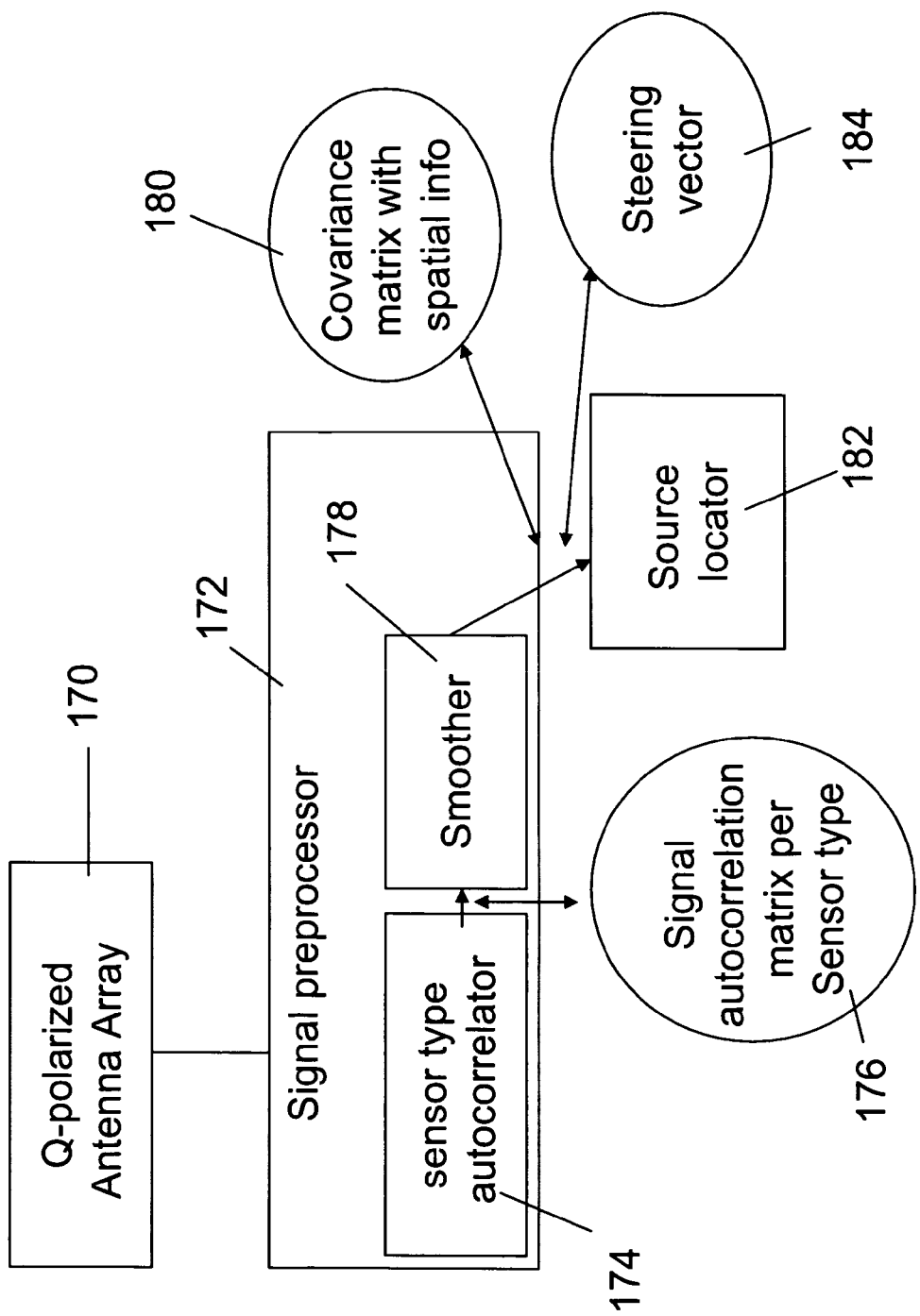
FIG. 17 is a simplified block diagram illustrating an embodiment according to the present invention.

Reference is now made to FIG. 17 which is a simplified block diagram illustrating a quadrature polarized antenna array 170 connected to a signal preprocessor 172. The signal preprocessor comprises a sensor type autocorrelator 174 which produces a signal autocorrelation matrix 176 per sensor type. The signal autocorrelation matrices are passed to a smoother 178 where they are smoothed to form covariance matrices 180 which have spatial spectral information. A source locator 182 uses the covariance matrix to find the source location, optionally with the help of a steering vector 184.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A quadrature polarized antenna array, comprising a plurality of antenna elements, each element comprising a plurality of electric dipoles arranged at a predetermined angle with respect to one another and a plurality of magnetic dipoles arranged at said predetermined angle with respect to one another, and wherein each magnetic dipole substantially shares a common location with a respective one of said electric dipoles, the antenna array, having connected thereto a signal preprocessor for preprocessing signals from said antenna for obtaining spatial spectrum information for signal source location, the preprocessor comprising:

a sensor type autocorrelator configured for forming signal autocorrelation matrices for each sensor type, and a smoother configured for smoothing said autocorrelation matrices, thereby to form at least one covariance matrix comprising spatial spectrum information.

2. The antenna array of claim 1, having connected thereto a source locator configured for using said at least one covariance matrix in an eigenstructure-based signal source localization technique.

3. The antenna array of claim 2, wherein said preprocessor is further able to use a steering vector together with said covariance matrix in said source locator.

4. The antenna array of claim 1, wherein said smoother is further configured to apply forward backward smoothing to said covariance matrix, thereby to increase a maximum number of signal sources that is localized.

5. A method for preprocessing incoming signals obtained using a plurality of different sensor types, the signals including coherent signals, the preprocessing being for source localization, the method comprising obtaining angle of arrival and polarization information of incoming signals from sensors of each of said different sensor types, forming signal autocorrelation matrices for each sensor type, and smoothing said autocorrelation matrices, to form therefrom at least one covariance matrix suitable for use in eigenstructure-based signal source localization techniques.

6. The method of claim 5, further comprising applying forward backward averaging to said covariance matrix, thereby to increase a maximum number of signal sources that can be localized.

7. The method of claim 5, further comprising obtaining a steering vector for use together with said covariance matrix in said eigenstructure-based signal localization techniques.

8. The method of claim 5, wherein said obtaining is from four sensor types.

9. The method of claim 8, wherein said four sensor types are two respectively orthogonal electrical dipoles and two respectively orthogonal magnetic dipoles.

10. The method of claim 9, wherein said four sensor types are all arranged for sensing in a single plane.

11. The method of claim 5, comprising using source localization information obtained from the data of said covariance matrix as an input to a beam director to provide a directed beam to a respective source.

12. The method of claim 5, wherein said incoming signal is a noise signal, the method further comprising using source localization information obtained from said covariance matrix as an input to a beam director to provide a null of a directed beam to a respective source of said noise signal.

13. Apparatus for preprocessing incoming signals obtained using a plurality of sensors of different sensor types, the signals including coherent signals, the preprocessing being for source localization, the apparatus comprising an input for obtaining angle of arrival and polarization information of incoming signals from sensors of each of said different sensor types, a sensor type autocorrelator configured for forming signal autocorrelation matrices for each sensor type, and a smoother, configured for smoothing said autocorrelation matrices, thereby to form at least one covariance matrix suitable for use in eigenstructure-based signal source localization techniques.

14. The apparatus of claim 13, wherein said smoother is further configured to apply forward backward averaging to said covariance matrix, thereby to increase a maximum number of signal sources that can be localized.

15. The apparatus of claim 13, further able to use a steering vector together with said covariance matrix in said eigenstructure-based signal localization techniques.

16. The apparatus of claim 13, wherein said sensor types comprise four sensor types.

17. The apparatus of claim 16, wherein said four sensor types are two respectively orthogonal electrical dipoles and two respectively orthogonal magnetic dipoles.

18. The apparatus of claim 17, wherein said four sensor types are all arranged for sensing in a single plane.

* * * * *